United States Patent
Nagasaka et al.

(10) Patent No.: US 10,736,011 B2
(45) Date of Patent: Aug. 4, 2020

(54) RADIO TERMINAL AND WWAN-SUPPORTING BASE STATION

(71) Applicant: KYOCERA CORPORATION, Kyoto (JP)

(72) Inventors: Yushi Nagasaka, Ritto (JP); Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 72 days.

(21) Appl. No.: 15/882,765

(22) Filed: Jan. 29, 2018

(65) Prior Publication Data
US 2018/0192346 A1 Jul. 5, 2018

Related U.S. Application Data

(63) Continuation of application No. PCT/JP2016/072432, filed on Jul. 29, 2016.
(Continued)

(51) Int. Cl.
*H04W 36/30* (2009.01)
*H04W 28/08* (2009.01)
(Continued)

(52) U.S. Cl.
CPC ........... *H04W 36/30* (2013.01); *H04W 28/08* (2013.01); *H04W 36/0022* (2013.01);
(Continued)

(58) Field of Classification Search
CPC ............. H04W 28/08; H04W 36/0022; H04W 36/0083; H04W 72/0413; H04W 36/30
See application file for complete search history.

(56) References Cited

U.S. PATENT DOCUMENTS

| | | | |
|---|---|---|---|
| 9,380,494 B2 * | 6/2016 | Sirotkin | H04W 28/08 |
| 2010/0165857 A1 * | 7/2010 | Meylan | H04L 43/00 |
| | | | 370/252 |

(Continued)

FOREIGN PATENT DOCUMENTS

| | | |
|---|---|---|
| WO | 2014/112599 A1 | 7/2014 |
| WO | 2014148969 A1 | 9/2014 |

OTHER PUBLICATIONS

International Search Report issued in PCT/JP2016/072432; dated Oct. 4, 2016.
(Continued)

*Primary Examiner* — Khaled M Kassim
*Assistant Examiner* — Syed Ali
(74) *Attorney, Agent, or Firm* — Studebaker & Brackett PC

(57) ABSTRACT

A radio terminal according to an embodiment includes a controller having a function of switching data between a wireless wide area network (WWAN) and a wireless local area network (WLAN) based on information configured from the WWAN; and a transmitter configured to transmit, to the WWAN, a WLAN measurement report in response to satisfaction of a predetermined condition, the WLAN measurement report including: a WLAN measurement results; and a WLAN related identifier indicating a WLAN to which the radio terminal has been connected. The predetermined condition includes a condition that the WLAN measurement is configured from the WWAN to the radio terminal.

4 Claims, 19 Drawing Sheets

Related U.S. Application Data

(60) Provisional application No. 62/198,907, filed on Jul. 30, 2015, provisional application No. 62/203,662, filed on Aug. 11, 2015, provisional application No. 62/291,659, filed on Feb. 5, 2016.

(51) Int. Cl.
| | |
|---|---|
| *H04W 36/00* | (2009.01) |
| *H04W 72/04* | (2009.01) |
| *H04W 48/18* | (2009.01) |
| *H04W 16/14* | (2009.01) |
| *H04W 84/12* | (2009.01) |
| *H04W 88/06* | (2009.01) |

(52) U.S. Cl.
CPC ... *H04W 36/0083* (2013.01); *H04W 72/0413* (2013.01); *H04W 16/14* (2013.01); *H04W 48/18* (2013.01); *H04W 84/12* (2013.01); *H04W 88/06* (2013.01)

(56) References Cited

U.S. PATENT DOCUMENTS

| | | | | |
|---|---|---|---|---|
| 2010/0234071 | A1* | 9/2010 | Shabtay | H04B 7/0408 455/562.1 |
| 2011/0320588 | A1* | 12/2011 | Raleigh | H04W 36/245 709/224 |
| 2013/0242783 | A1 | 9/2013 | Horn et al. | |
| 2014/0043979 | A1* | 2/2014 | Etemad | H04W 28/0205 370/237 |
| 2015/0043373 | A1 | 2/2015 | Wu | |
| 2015/0043486 | A1* | 2/2015 | Ozturk | H04W 88/06 370/329 |
| 2015/0103812 | A1* | 4/2015 | Zhao | H04W 48/16 370/338 |
| 2015/0264699 | A1* | 9/2015 | Fwu | H04L 5/003 370/329 |
| 2015/0304929 | A1* | 10/2015 | Hua | H04W 36/32 455/436 |
| 2015/0358884 | A1 | 12/2015 | Nagasaka et al. | |
| 2016/0021673 | A1* | 1/2016 | Ahmadzadeh | H04W 72/085 370/331 |
| 2016/0165428 | A1* | 6/2016 | Lee | H04W 8/20 455/434 |
| 2018/0124642 | A1* | 5/2018 | Phuyal | H04W 28/08 |
| 2018/0227812 | A1* | 8/2018 | Nagasaka | H04W 88/06 |

OTHER PUBLICATIONS

Mediatek Inc.; "Traffic Steering Procedure and Command for NCIWK"; 3GPP TSG-RAN2 #90 Meeting; R2-152139; May 25-29, 2015; pp. 1-4; Fukuoka, Japan.

Mediatek Inc.; "Some Considerations for Network-Controlled LTE-WLAN Radio Level Interworking"; 3GPP TSG-RAN2 #89BIS meeting; R2-151680; Apr. 20-24, 2015; pp. 1-4; Bratislava, Slovakia.

Ericsson et al.; "WLAN/3GPP Radio Interworking—More on IDLE and CONNECTED Mode Solution"; 3GPP TSG-RAN WG2 #82; R2-131886; May 20-24, 2013; pp. 1-11; Fukuoka, Japan.

Huawei et al.; "LTE-WLAN Interworking Enhancement"; 3GPP TSG-RAN WG2 Meeting #89bis; R2-151572; Apr. 20-24, 2015; pp. 1-8; Bratislava, Slovakia.

LG Electronics Inc.; "RAN/WLAN Aggregation Procedure"; 3GPP TSG-RAN WG2 #89bis; R2-151654; Apr. 20-24, 2013; pp. 1-4; Bratislava, Slovakia.

Samsung; "Core Network Requirements for LTE-WLAN Interworking"; 3GPP TSG-RAN WG2 Meeting #90; R2-152246; May 25-29, 2015; pp. 1-4; Fukuoka, Japan.

CATT; "Discussion on Architectural and Procedure of C-plane for LTE-WLAN Aggregation"; 3GPP TSG RAN WG2 Meeting #90; R2-152125; May 25-29, 2015; pp. 1-6; Fukuoka, Japan.

Nokia Networks et al.; "Considerations on 3G-WLAN Interworking"; 3GPP TSG-RAN WG3 Meeting #87bis; R3-150878; Apr. 20-24, 2015; pp. 1-5; Santa Cruz, Spain.

Qualcomm Incorporated; "RRM Measurements for WLAN"; 3GPP TSG-RAN WG2 Meeting #90; R2-152744; May 25-29, 2015; pp. 1-4; Fukuoka, Japan.

An Office Action issued by the Japanese Patent Office dated Mar. 13, 2018, which corresponds to Japanese Patent Application No. 2017-530953 and is related to U.S. Appl. No. 15/882,765; with English language Concise Explanation.

\* cited by examiner

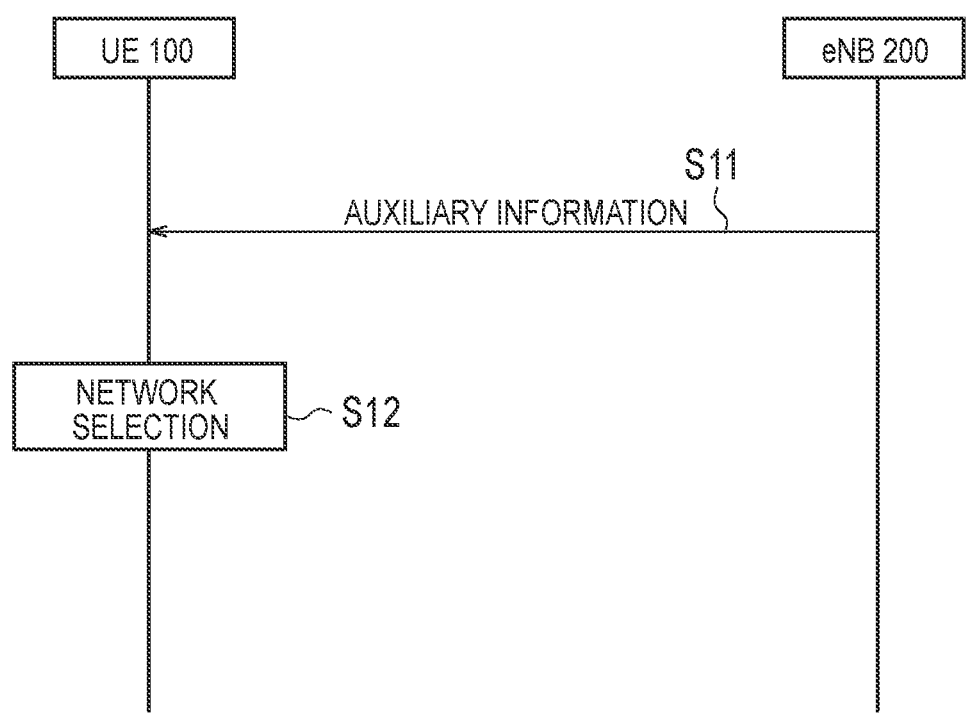

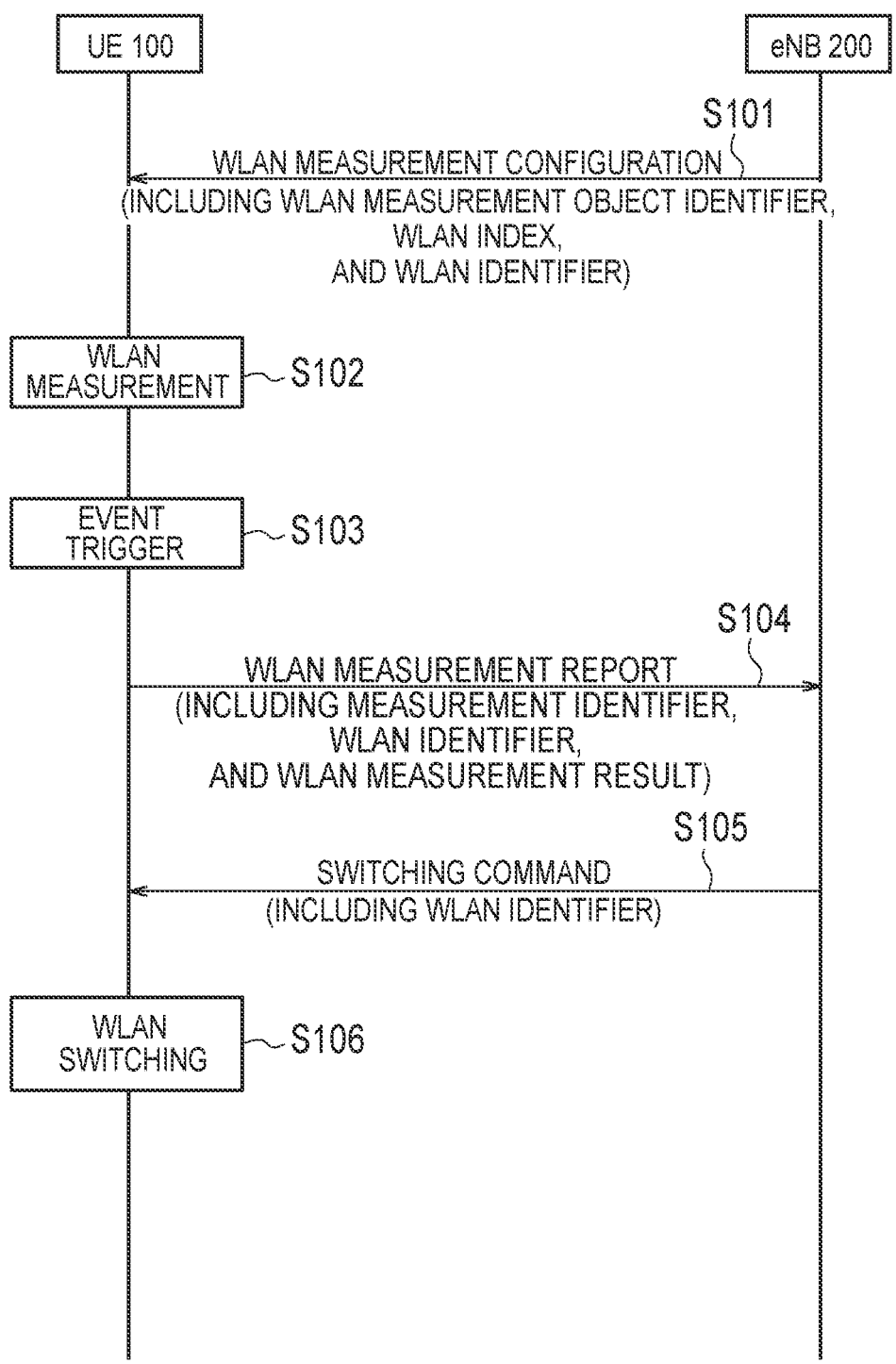

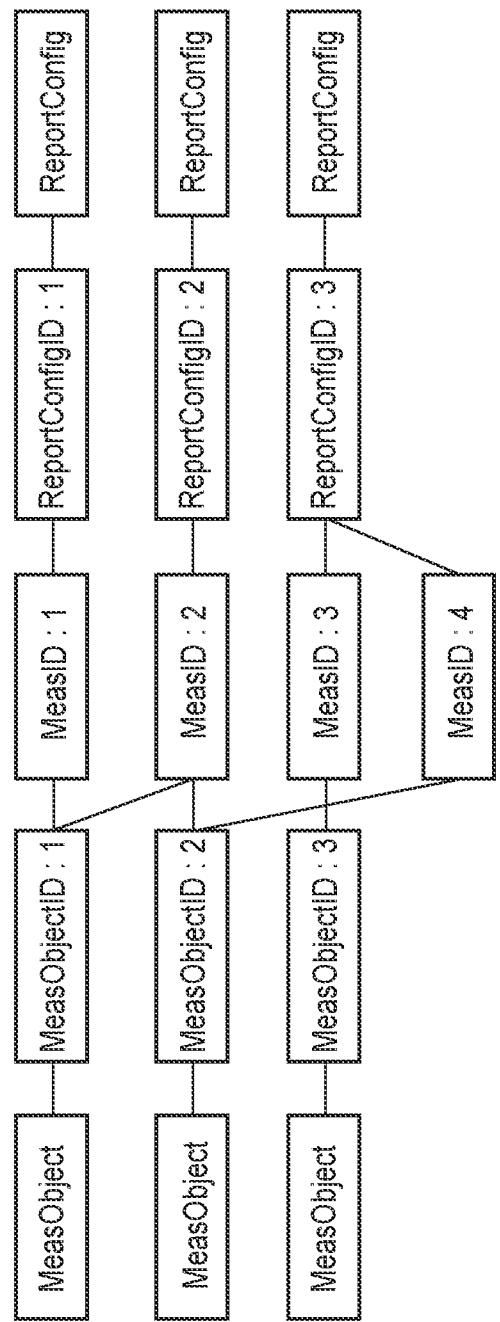

FIG. 8

```
MeasConfig ::=                    SEQUENCE {
    -- Measurement objects
    measObjectToRemoveList        MeasObjectToRemoveList        OPTIONAL,   -- Need ON
    measObjectToAddModList        MeasObjectToAddModList        OPTIONAL,   -- Need ON
```

...

```
MeasObjectToAddModList ::=        SEQUENCE (SIZE (1..maxObjectId)) OF MeasObjectToAddMod
```

...

```
MeasObjectToAddMod ::= SEQUENCE {
    measObjectId                  MeasObjectId,
    measObject                    CHOICE {
        measObjectEUTRA               MeasObjectEUTRA,
        measObjectUTRA                MeasObjectUTRA,
        measObjectGERAN               MeasObjectGERAN,
        measObjectCDMA2000            MeasObjectCDMA2000,
        measObjectWLAN                MeasObjectWLAN,
        ...
    }
}
```

...

```
MeasObjectWLAN ::=                SEQUENCE {
    wlancarrierFreq               ENUMERATED {GHz2.4, GHz5.0},              -- Need ON
    wlansToRemoveList             WlanIndexList                 OPTIONAL,   -- Need ON
    wlansToAddModList             WlansToAddModList             OPTIONAL,   -- Need ON
    wlansToAddModList ::=         SEQUENCE (SIZE (1.. maxWLAN-Id-r13)) OF WlansToAddMod
    wlansToAddMod ::= SEQUENCE {
        wlanIndex                 INTEGER (1.. maxWLAN-Id-r13),
        wlan-Identifiers-r13      wlan-Identifiers-r13
    }
}
```

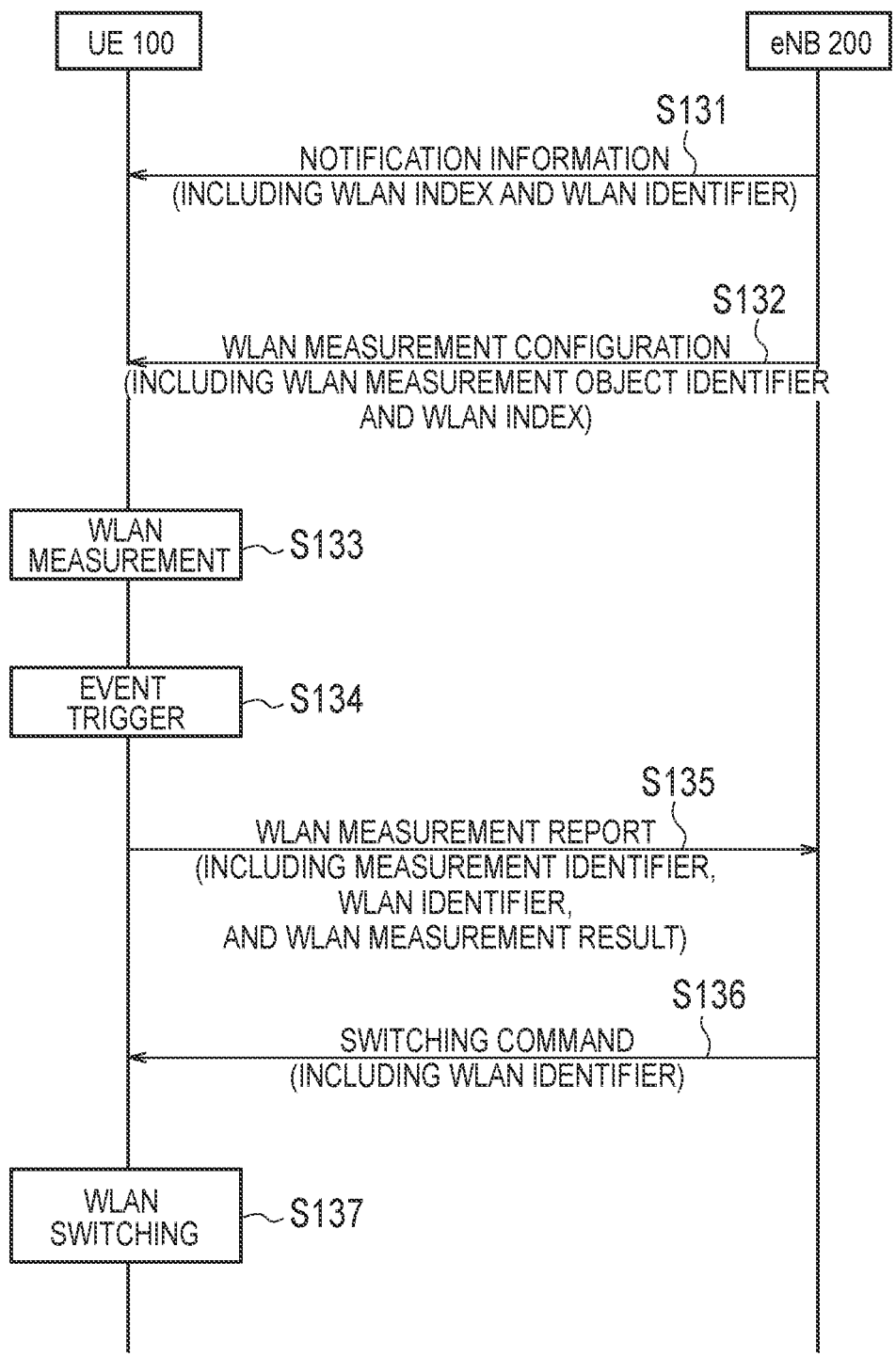

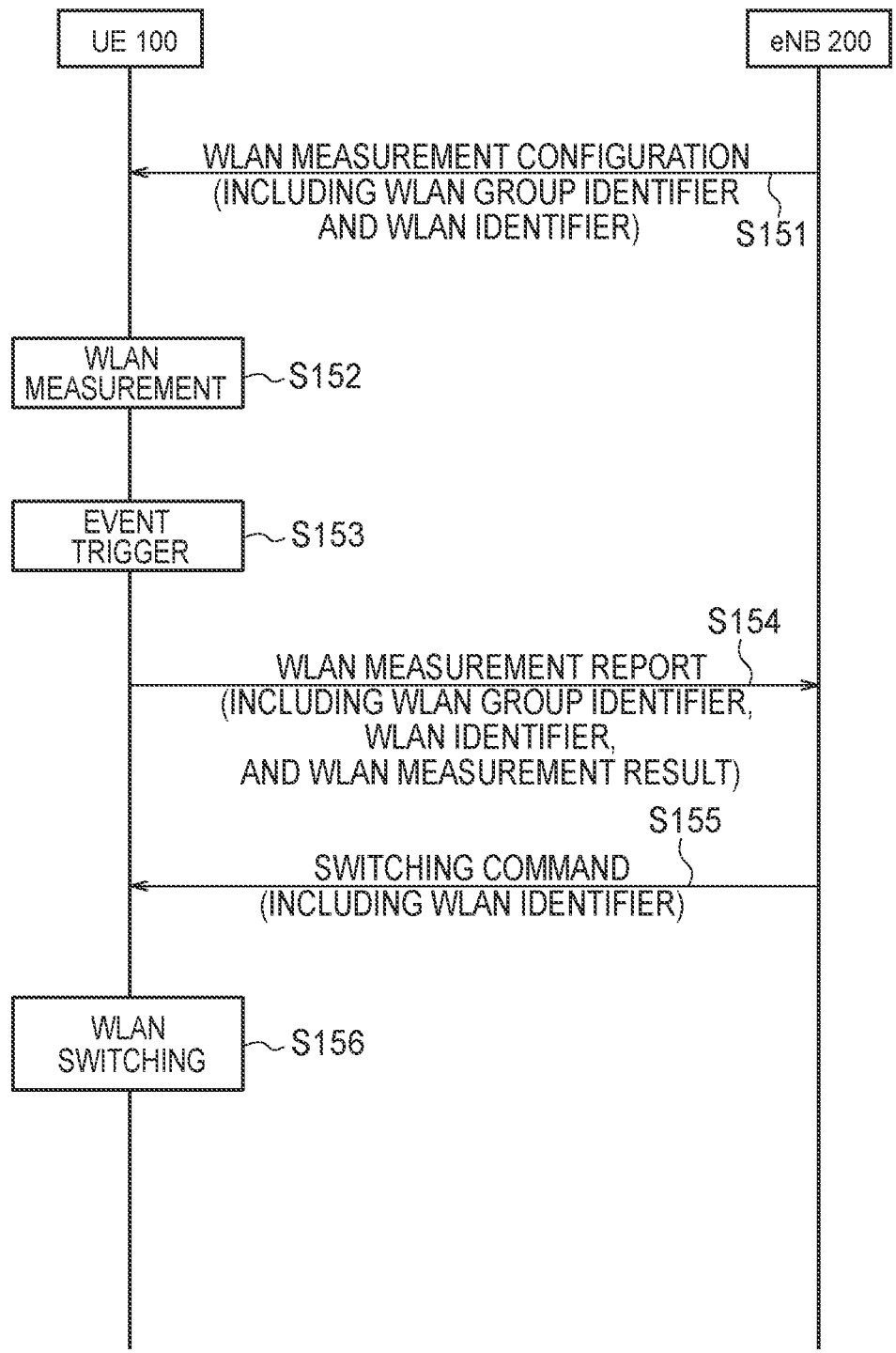

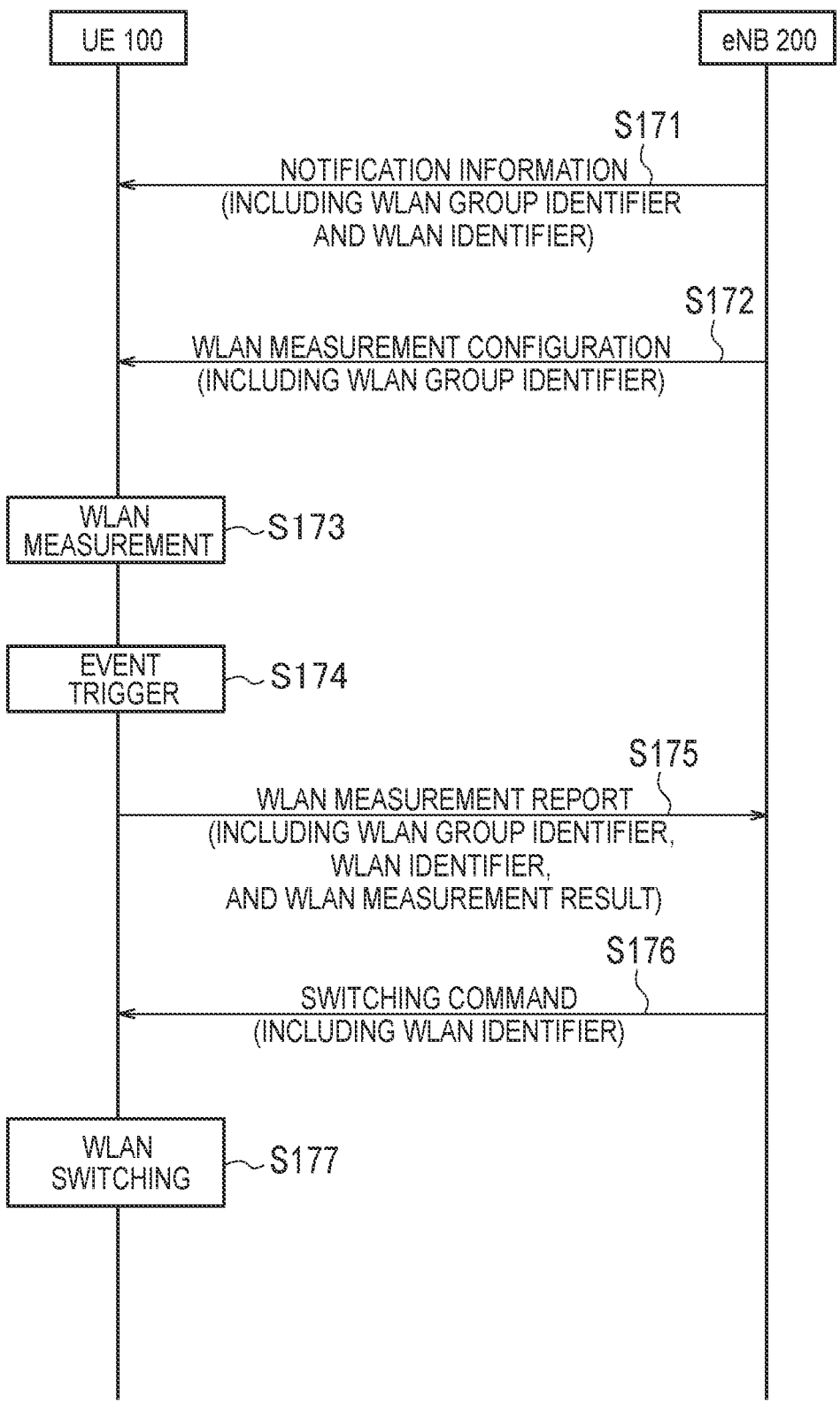

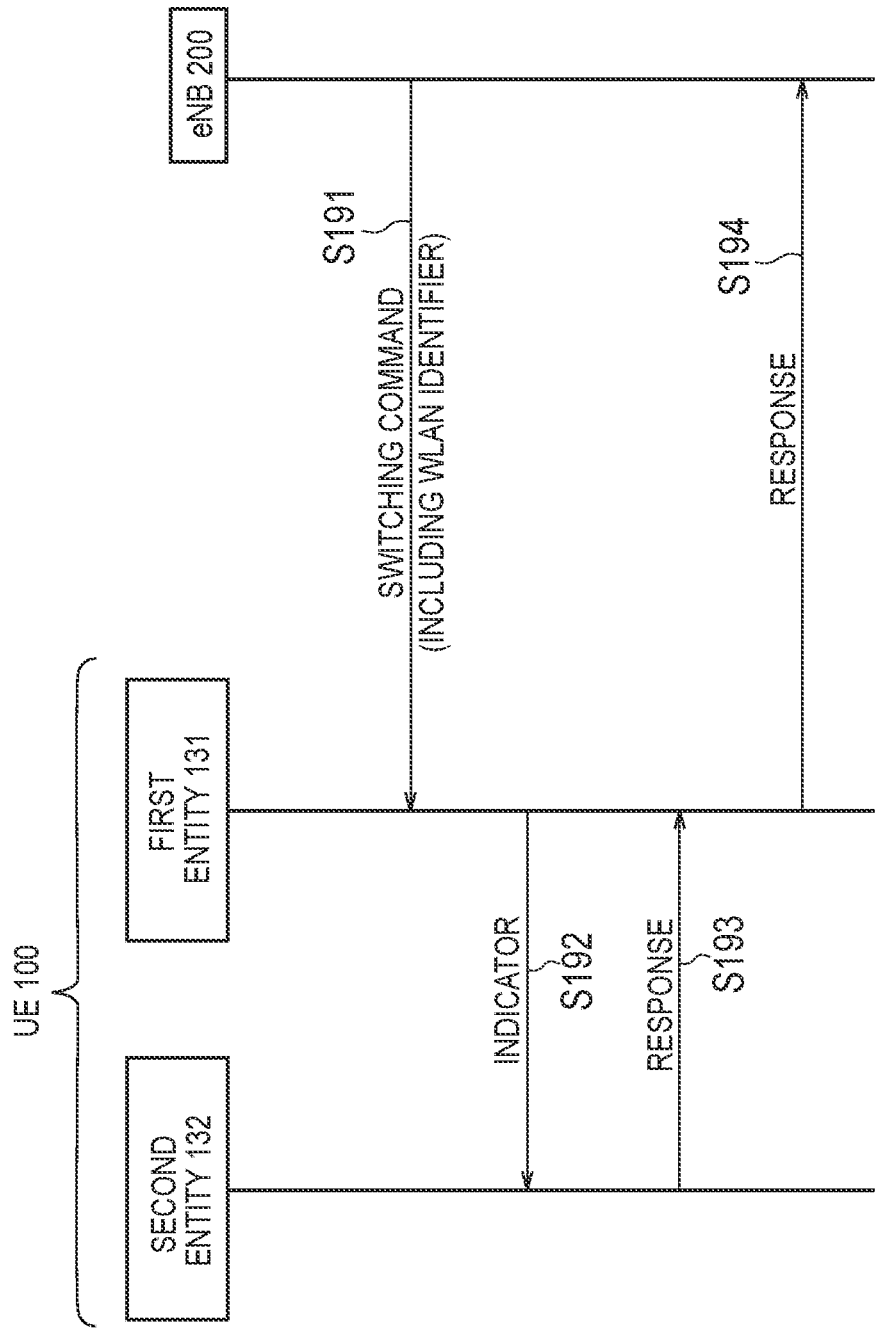

RADIO TERMINAL AND WWAN-SUPPORTING BASE STATION

RELATED APPLICATION

This application is a continuation application of international application PCT/JP2016/072432, filed Jul. 29, 2016, which claims the benefit of U.S. Patent Provisional Application No. 62/198,907 (filed on Jul. 30, 2015), U.S. Patent Provisional Application No. 62/203,662 (filed on Aug. 11, 2015), and U.S. Patent Provisional Application No. 62/291,659 (filed on Feb. 5, 2016), the entire contents of which are incorporated herein by reference.

TECHNICAL FIELD

The present disclosure relates to a radio terminal and a WWAN-supporting base station in a system in which a WLAN interworks with a WWAN.

BACKGROUND ART

In recent years, radio terminals compatible with both wireless wide area network (WWAN) communication and wireless local area network (WLAN) communication have been becoming widespread. In order to provide high-speed and large-capacity communication services to such radio terminals, technology for enhancing interworking between the WWAN and the WLAN is being studied.

SUMMARY

A radio terminal according to an embodiment includes a controller comprising a first entity configured to perform wireless wide area network (WWAN) communication with a WWAN-supporting base station, and a second entity located at a higher layer than the first entity. When the radio terminal receives, from the WWAN-supporting base station, a switching command for switching a communication target network used for data communication of the radio terminal between a WWAN and a wireless local area network (WLAN), the first entity is configured to notify the second entity of an indicator indicating the switching of the communication target network.

A WWAN-supporting base station according to an embodiment is configured to perform WWAN communication with a radio terminal. The WWAN-supporting base station includes: a controller configured to perform network selection to select WWAN or WLAN as a communication target network used for data communication of the radio terminal, and transmit, to the radio terminal, a switching command for switching the communication target network between the WWAN and the WLAN, based on a result of the network selection. The controller is configured to perform the network selection based on predetermined information acquired from a specific apparatus different from the radio terminal.

A WWAN-supporting base station according to an embodiment is connected to a WLAN termination apparatus via an Xw interface, the WLAN termination apparatus being provided in a WLAN and configured to terminate the Xw interface. The WWAN-supporting base station includes a controller configured to perform a process of transmitting, to the WLAN termination apparatus on the Xw interface, a request message requesting transmission of information related to a load of a WLAN access point, and a process of receiving the information transmitted from the WLAN termination apparatus on the Xw interface.

A radio terminal according to an embodiment includes a controller configured to perform a process of receiving, from a wireless wide area network (WWAN)-supporting base station, a wireless local area network (WLAN) measurement configuration for configuring a WLAN measurement report related to measurement on the WLAN. The WLAN measurement configuration includes information related to a usage of the WLAN measurement report.

A radio terminal according to an embodiment includes a controller having a function of switching data between a wireless wide area network (WWAN) and a wireless local area network (WLAN) based on information configured from the WWAN. The controller is configured to transmit, to the WWAN, a notification related to a state of connection to the WLAN. The notification includes at least one of data related information indicating whether the radio terminal has data that is switchable from the WWAN to the WLAN, and a WLAN related identifier indicating a WLAN to which the radio terminal has been connected.

A wireless wide area network (WWAN)-supporting base station according to an embodiment includes a controller configured to receive a notification from a radio terminal having a function of switching data between a WWAN and a wireless local area network (WLAN) and configure information for the function in the radio terminal based on the notification. The notification includes at least one of data related information indicating whether the radio terminal has data that is switchable from the WWAN to the WLAN, and a WLAN related identifier indicating a WLAN to which the radio terminal has been connected.

A radio terminal according to an embodiment includes a controller having a function of switching data between a wireless wide area network (WWAN) and a wireless local area network (WLAN) based on information configured from the WWAN. The controller is configured to transmit, to the WWAN, a measurement report including a WLAN measurement result. The controller is configured to include, in the measurement report, a notification related to a state of connection to the WLAN and transmit the measurement report to the WWAN.

BRIEF DESCRIPTION OF DRAWINGS

FIG. 5 is a diagram for describing a terminal-based scheme.

FIG. 6 is a sequence diagram illustrating an operation pattern 1A of a base station-based scheme according to the first embodiment.

FIG. 7 is a diagram illustrating an architecture of a WLAN measurement configuration according to the first embodiment.

FIG. 8 is a diagram illustrating a specific example of a WLAN measurement configuration in the operation pattern 1A of the base station-based scheme according to the first embodiment.

FIG. 9 is a sequence diagram illustrating an operation pattern 1B of the base station-based scheme according to the first embodiment.

FIG. 10 is a sequence diagram illustrating an operation pattern 2A of the base station-based scheme according to the first embodiment.

FIG. 11 is a sequence diagram illustrating an operation pattern 2B of the base station-based scheme according to the first embodiment.

FIG. 12 is a sequence diagram illustrating an operation of a UE having received a switching command according to the first embodiment.

DESCRIPTION OF EMBODIMENTS

Overview of Embodiments

Figure 1:
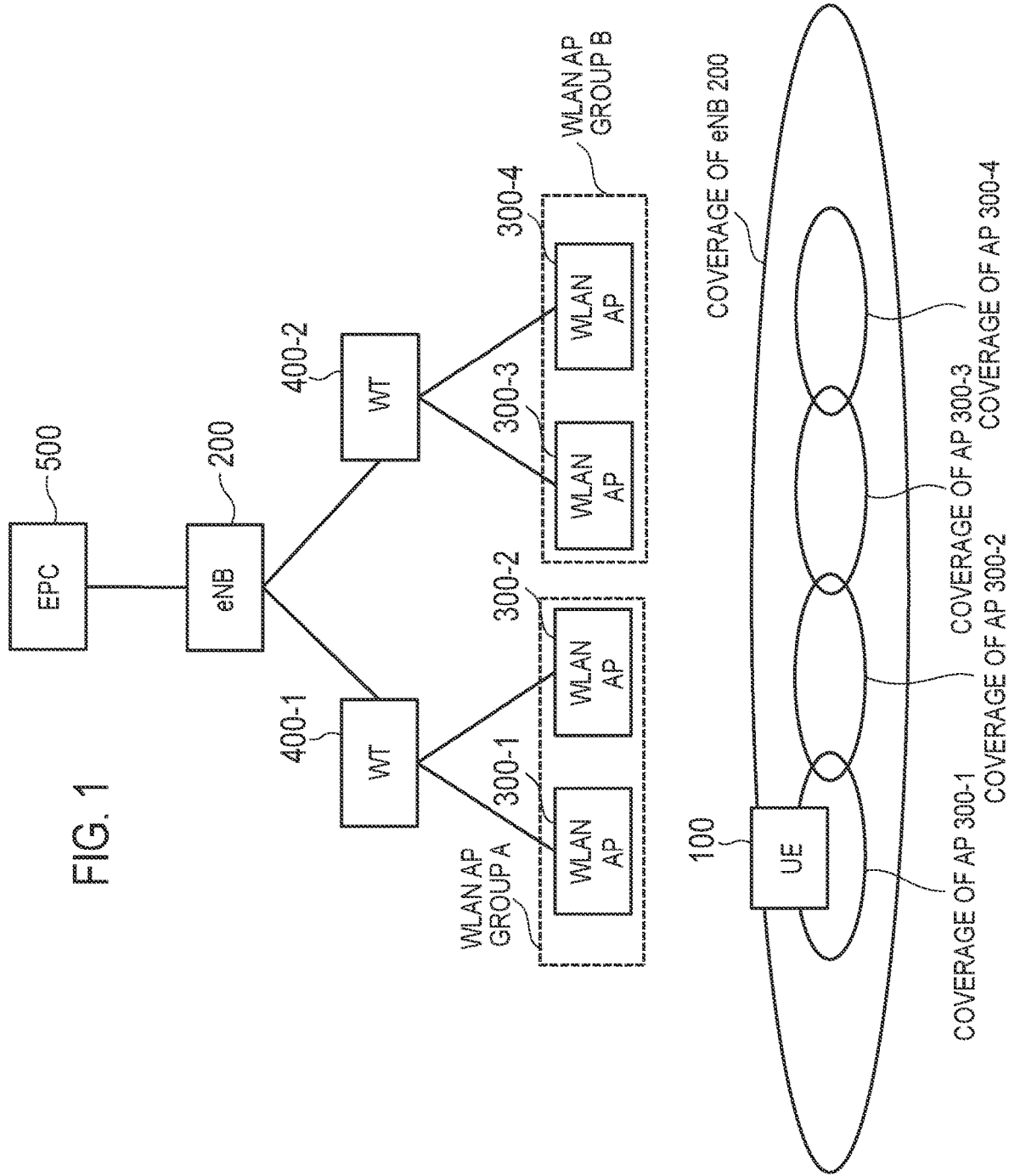
FIG. 1 is a diagram illustrating an architecture of a communication system according to first to fourth embodiments.

A radio terminal according to an embodiment includes a controller comprising a first entity configured to perform wireless wide area network (WWAN) communication with a WWAN-supporting base station, and a second entity located at a higher layer than the first entity. When the radio terminal receives, from the WWAN-supporting base station, a switching command for switching a communication target network used for data communication of the radio terminal between a WWAN and a wireless local area network (WLAN), the first entity is configured to notify the second entity of an indicator indicating the switching of the communication target network.

In an embodiment, a terminal-based scheme in which the first entity performs network selection to select the communication target network from among the WWAN and the WLAN, and a base station-based scheme in which the WWAN-supporting base station performs the network selection are defined. When the radio terminal receives the switching command from the WWAN-supporting base station, the first entity is configured to notify the second entity of the indicator capable of identifying that the base station-based scheme is applied.

In an embodiment, the indicator capable of identifying that the base station-based scheme is applied is an indicator dedicated to the base station-based scheme.

In an embodiment, the indicator capable of identifying that the base station-based scheme is applied is obtained by adding information indicating the base station-based scheme to an indicator in the terminal-based scheme.

In an embodiment, when the switching command instructs switching from the WWAN to the WLAN, the switching command includes an identifier related to a WLAN to be connected. When the second entity is notified of the indicator, the first entity is configured to notify the second entity of the identifier related to the WLAN to be connected, the identifier being included in the switching command.

In an embodiment, the switching command includes a bearer identifier of an object to be switched.

In an embodiment, when the second entity is notified of the indicator, the first entity is configured to notify the second entity of the bearer identifier included in the switching command.

In an embodiment, the first entity is configured to acquire, from the second entity, at least one of an identifier of a bearer where the second entity performs switching and an identifier of a bearer where the second entity does not perform switching.

In an embodiment, the first entity is configured to transmit, to the WWAN-supporting base station, at least one of the identifier of the bearer where the second entity performs switching and the identifier of the bearer where the second entity does not perform switching.

In an embodiment, when the radio terminal is connected to the WLAN in response to the reception of the switching command, the first entity is configured to transmit, to the WWAN-supporting base station, a report indicating the connection to the WLAN.

In an embodiment, in a case of not following the switching command even if the switching command is received, the first entity is configured to transmit, to the WWAN-supporting base station, information indicating a cause for not following the switching command.

A WWAN-supporting base station according to an embodiment is configured to perform WWAN communication with a radio terminal. The WWAN-supporting base station includes: a controller configured to perform network selection to select WWAN or WLAN as a communication target network used for data communication of the radio terminal, and transmit, to the radio terminal, a switching command for switching the communication target network between the WWAN and the WLAN, based on a result of the network selection. The controller is configured to perform the network selection based on predetermined information acquired from a specific apparatus different from the radio terminal.

In an embodiment, the specific apparatus is a core network apparatus provided in a core network of the WWAN. The predetermined information is bearer information indicating whether the data is data belonging to a bearer that is switchable from the WWAN to the WLAN.

In an embodiment, the controller is configured to acquire the bearer information from the core network apparatus upon establishment of the bearer or modification of the bearer.

In an embodiment, the specific apparatus is a WLAN apparatus provided in the WLAN. The predetermined information is at least one of location information related to a WLAN-supporting access point, load information related to the WLAN-supporting access point, and performance information related to the WLAN-supporting access point.

In an embodiment, the controller is configured to acquire information related to a bearer switched between the WWAN and the WLAN from a core network apparatus provided in a core network of the WWAN. The information acquired from the core network apparatus includes information indicating switching between the WWAN and the WLAN.

A radio terminal according to an embodiment includes a controller configured to perform a process of receiving, from a wireless wide area network (WWAN)-supporting base station, a wireless local area network (WLAN) measurement configuration for configuring a WLAN measurement report related to measurement on the WLAN. The WLAN measurement configuration includes information related to a usage of the WLAN measurement report.

In an embodiment, the usage includes a specific usage for switching a network used for data communication of the radio terminal from WWAN to the WLAN.

In an embodiment, the controller comprises a first entity configured to perform communication with the WWAN-supporting base station, and a second entity located at a higher layer than the first entity. Information related to the usage indicates the specific usage, the first entity is configured to inquire of the second entity about presence or absence of data that is switchable from the WWAN to the WLAN.

In an embodiment, the first entity is configured to notify the WWAN-supporting base station of a result of the inquiry to the second entity.

In an embodiment, when the information related to the usage indicates the specific usage and the measurement result for the WLAN satisfies a transmission condition of the WLAN measurement report, the first entity is configured to inquire of the second entity about the presence or absence of data that is switchable from the WWAN to the WLAN.

In an embodiment, when the result of the inquiry to the second entity indicates that the data switchable from the WWAN to the WLAN is present, the first entity is configured to transmit the WLAN measurement report to the WWAN-supporting base station. When the result of the inquiry to the second entity indicates that the data switchable from the WWAN to the WLAN is absent, the first entity is configured to stop the transmission of the WLAN measurement report.

In an embodiment, the controller comprises a first entity configured to perform communication with the WWAN-supporting base station, and a second entity located at a higher layer than the first entity. The first entity is configured to inquire of the second entity about preference information of a user of the radio terminal, based on the information related to the usage.

In an embodiment, the preference information includes at least one of on/off configuration of a WLAN communication function of the radio terminal and the user's interest in a specific usage of the WLAN measurement report.

A wireless wide area network (WWAN)-supporting base station according to an embodiment includes a controller configured to perform a process of transmitting, to a radio terminal, a wireless local area network (WLAN) measurement configuration for configuring a WLAN measurement report related to measurement on the WLAN. The WLAN measurement configuration includes information related to a usage of the WLAN measurement report.

A radio terminal according to an embodiment includes a controller having a function of switching data between a wireless wide area network (WWAN) and a wireless local area network (WLAN) based on information configured from the WWAN. The controller is configured to transmit, to the WWAN, a notification related to a state of connection to the WLAN. The notification includes at least one of data related information indicating whether the radio terminal has data that is switchable from the WWAN to the WLAN, and a WLAN related identifier indicating a WLAN to which the radio terminal has been connected.

In an embodiment, the controller is configured to switch data from the WWAN to the WLAN in predetermined units. The data related information includes an identifier or a number of the predetermined units that are switchable from the WWAN to the WLAN.

In an embodiment, the controller is configured to include the WLAN related identifier in the notification only when the radio terminal is connected to the WLAN.

In an embodiment, the WLAN related identifier indicates at least one of a WLAN connected by a determination of the radio terminal based on an auxiliary parameter provided from the WWAN, a WLAN connected by a user's manual operation, and a WLAN connected during an idle mode of the radio terminal.

In an embodiment, the controller is configured to transmit, to the WWAN, a measurement report including a WLAN measurement result. The controller is configured to include the notification in the measurement report.

In an embodiment, the controller is configured to transmit the notification to the WWAN in response to satisfaction of a predetermined condition. The predetermined condition includes at least one of a condition that the radio terminal is in data communication, a condition that the radio terminal has transitioned from an idle mode to a connected mode, a condition that the WLAN measurement is configured from the WWAN to the radio terminal, a condition that a timer for prohibiting the transmission of the notification is not operating, and a condition that the WWAN permits the transmission of the notification.

In an embodiment, the radio terminal comprises a WLAN communication unit configured to perform communication with the WLAN. When the WLAN communication unit is in an occupied state, the controller is configured to perform control not to transmit, to the WWAN, a measurement report including a WLAN measurement result. The occupied state indicates a state in which the WLAN communication unit is unusable for the function.

In an embodiment, the radio terminal includes a WLAN communication unit configured to perform communication with the WLAN. The controller is configured to transmit, to the WWAN, a measurement report including a WLAN measurement result, based on a WLAN measurement configuration configured from the WWAN to the radio terminal. The WLAN measurement configuration includes information specifying a state of the WLAN communication unit as a condition for transmitting the measurement report.

A wireless wide area network (WWAN)-supporting base station according to an embodiment includes a controller configured to receive a notification from a radio terminal having a function of switching data between a WWAN and a wireless local area network (WLAN) and configure information for the function in the radio terminal based on the notification. The notification includes at least one of data related information indicating whether the radio terminal has data that is switchable from the WWAN to the WLAN, and a WLAN related identifier indicating a WLAN to which the radio terminal has been connected.

First Embodiment

A first embodiment will be described below.

In the first embodiment, an example in which a WWAN system is a Long Term Evolution (LTE) system will be described. The LTE system is a system of which the specifications are formulated in the 3rd Generation Partnership Project (3GPP) that is a standardization project.

(System Architecture)

FIG. 1 is a diagram illustrating an architecture of a communication system according to the first embodiment.

As illustrated in FIG. 1, the communication system according to the first embodiment includes a user equipment (UE) 100, an evolved Node-B (eNB) 200, a WLAN-supporting access point (WLAN AP) 300, a WLAN termination (WT) 400, and an evolved packet core (EPC) 500. The UE 100 corresponds to a radio terminal. The eNB 200 corresponds to a WWAN-supporting base station. The eNB 200 and the EPC 500 constitute a WWAN (LTE network). The WLAN AP 300 and the WT 400 constitute a WLAN. However, the communication system may not include the WT 400.

The UE 100 is a mobile apparatus compatible with both WWAN communication (LTE communication) and WLAN communication. The UE 100 supports WWAN/WLAN cooperation technology. The architecture of the UE 100 will be described later.

The eNB 200 is an apparatus that manages one or more cells and performs LTE communication with the UE 100 connected to the eNB's own cell. The architecture of the UE 100 will be described later.

The eNB 200 constitutes an Evolved-UMTS Terrestrial Radio Access Network (E-UTRAN). The eNB 200 is connected to an adjacent eNB via an X2 interface. The eNB 200 has a radio resource management (RRM) function, a routing function of user data (hereinafter, simply referred to as "data"), a measurement control function for mobility control and scheduling, and the like. The architecture of the eNB 200 will be described later. Note that the "cell" is used as the term indicating a minimum unit of a radio communication area (coverage) and is also used as the term indicating a function of performing radio communication with the UE 100.

The WLAN AP 300 is an apparatus that performs WLAN communication with the UE 100 connected to the WLAN AP. FIG. 1 illustrates an example in which four WLAN APs 300-1 to 300-4 are provided within the cell coverage of the eNB 200. Note that the eNB 200 may also have the function of the WLAN AP. Such a scenario is referred to as a collocated scenario.

The WT 400 is an apparatus that terminates an Xw interface which is a direct interface with the eNB 200. The WT 400 accommodates a plurality of WLAN APs 300. FIG. 1 illustrates an example in which a WT 400-1 accommodates two WLAN APs 300-1 and 300-2 and a WT 400-2 accommodates two WLAN APs 300-3 and 300-4.

Further, in the first embodiment, the WLAN APs 300-1 and 300-2 constitute a WLAN AP group A. The WLAN APs 300-3 and 300-4 constitute a WLAN AP group B. FIG. 1 illustrates an example in which the WLAN AP group is constituted by the WLAN APs 300 accommodated in the same WT 400. However, the WLAN AP group may be constituted by the WLAN APs 300 accommodated in different WTs 400.

Here, the WLAN AP group is a group that enables the UE 100 to autonomously perform switching control between the WLAN APs 300 independently of the command of the eNB 200. The WLAN AP group may be referred to as a "WLAN mobility set". The UE 100 can switch the WLAN communication from one WLAN AP to another WLAN AP within the same WLAN AP group, transparently to the eNB 200, by using a WLAN mobility control function. On the other hand, switching between different WLAN AP groups is controlled by the eNB 200.

The EPC 500 is connected to the eNB 200 via an S1 interface. The EPC 500 corresponds to a core network. The EPC 500 includes a mobility management entity (MME) and a serving-gateway (S-GW). The MME performs various types of mobility control or the like on the UE 100. The S-GW performs data transfer control.

Figure 2:
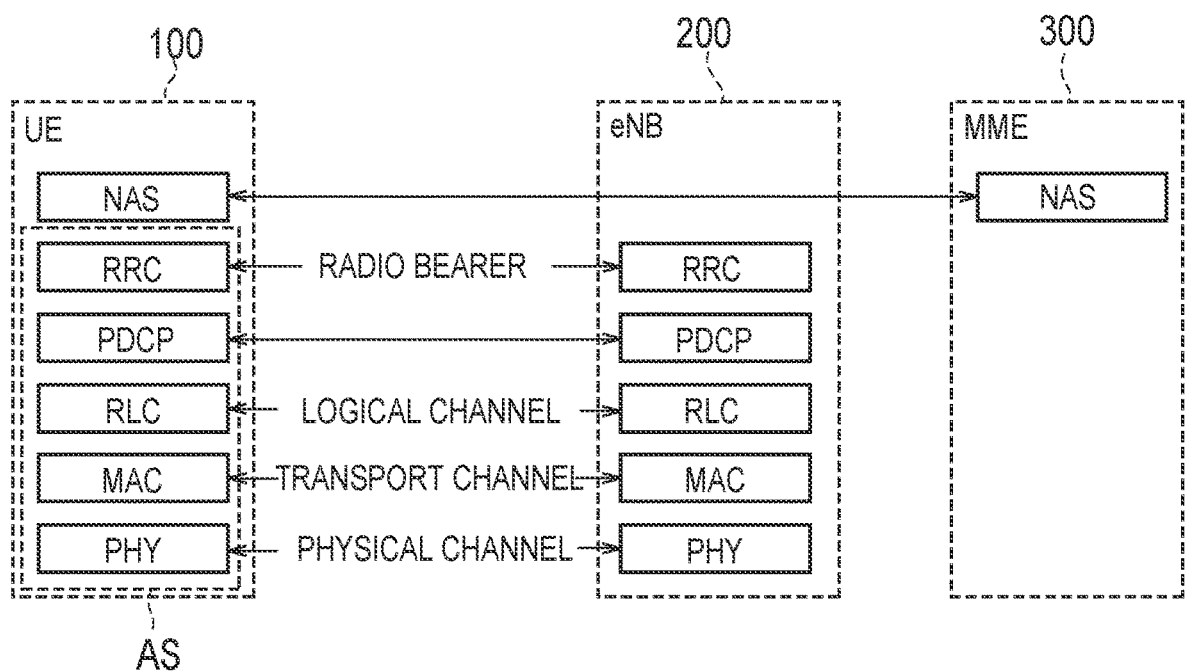
FIG. 2 is a protocol stack diagram of a radio interface in an LTE system.

(LTE Protocol) FIG. 2 is a protocol stack diagram of a radio interface in an LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), and a random access procedure, and the like. Data and control signals are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signal. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode (connected mode); otherwise, the UE 100 is in an RRC idle mode (idle mode).

A non-access stratum (NAS) layer, which is located above the RRC layer, performs session management, mobility management, and the like.

The PHY layer, the MAC layer, the RLC layer, the PDCP layer, and the RRC layer constitute an access stratum (AS) layer. In the first embodiment, the AS layer corresponds to a first entity that performs LTE communication (WWAN communication) with the eNB 200 (WWAN-supporting base station).

(Architecture of Radio Terminal)

Figure 3:
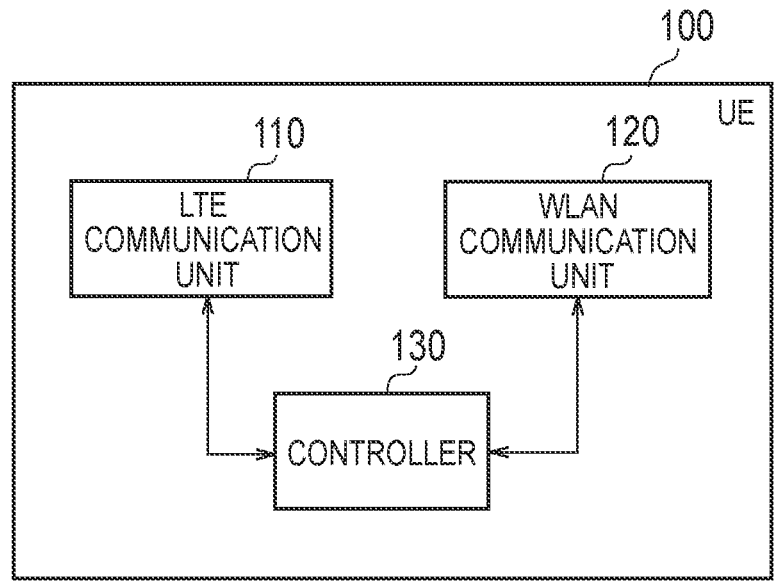
FIG. 3 is a block diagram of a UE (radio terminal).

FIG. 3 is a block diagram of the UE 100 (radio terminal). As illustrated in FIG. 3, the UE 100 includes an LTE communication unit (WWAN communication unit) 110, a WLAN communication unit 120, and a controller 130.

The LTE communication unit 110 performs LTE communication under the control of the controller 130. The LTE communication unit 110 may execute a part of an LTE protocol. The LTE communication unit 110 includes an antenna, a transmitter, and a receiver. The transmitter converts a baseband signal (transmission signal) output by the controller 130 into an LTE radio signal and transmits the LTE radio signal from the antenna. The receiver converts an LTE radio signal received by the antenna into a baseband signal (reception signal) and outputs the baseband signal to the controller 130. Note that the LTE communication is generally performed in a licensed band.

The WLAN communication unit 120 performs WLAN communication under the control of the controller 130. The WLAN communication unit 120 may execute a part of a WLAN protocol. The WLAN communication unit 120 includes an antenna, a transmitter, and a receiver. The transmitter converts a baseband signal (transmission signal) output by the controller 130 into a WLAN radio signal and transmits the WLAN radio signal from the antenna. The receiver converts a WLAN radio signal received by the antenna into a baseband signal (reception signal) and outputs the baseband signal to the controller 130. Note that the WLAN communication is generally performed in a unlicensed band.

The controller 130 performs various types of control on the UE 100. The controller 130 may execute a part of the LTE protocol, and may execute a part of the WLAN protocol. The controller 130 includes a processor and a memory. The memory stores a program executed by the processor, and information used for a process by the processor. The processor may include a baseband processor that performs modulation and demodulation, coding and decoding, and the like of the baseband signal, and a central processing unit (CPU) that performs a variety of processes by executing a program stored in the memory. The processor performs a variety of processes to be described later.

(Architecture of Base Station)

Figure 4:
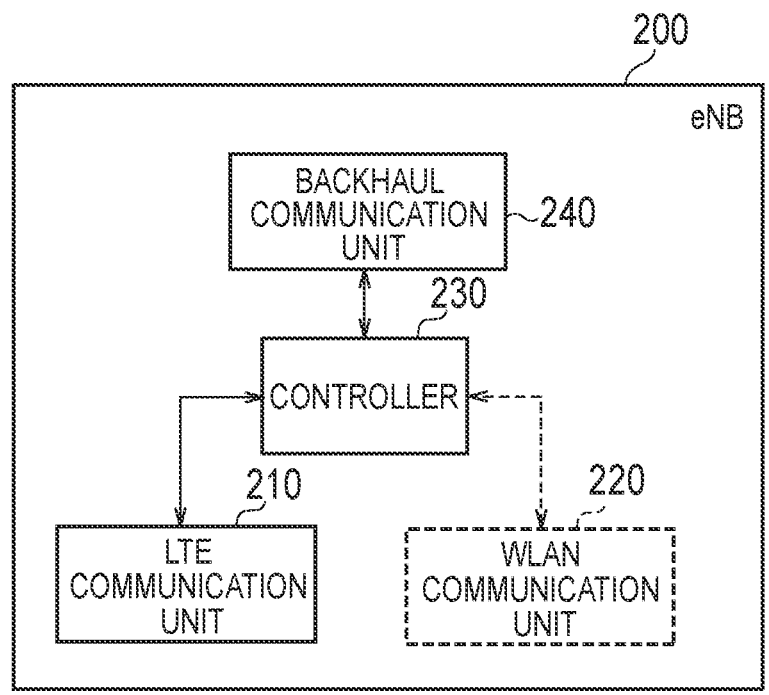
FIG. 4 is a block diagram of an eNB (WWAN-supporting base station).

FIG. 4 is a block diagram of the eNB 200 (base station). As illustrated in FIG. 4, the eNB 200 includes an LTE communication unit (WWAN communication unit) 210, a controller 230, and a backhaul communication unit 240. However, in the case of the collocated scenario, the eNB 200 may include a WLAN communication unit 220.

The LTE communication unit 210 performs LTE communication under the control of the controller 230. The LTE communication unit 210 may execute a part of an LTE protocol. The LTE communication unit 210 includes an antenna, a transmitter, and a receiver. The transmitter converts a baseband signal (transmission signal) output by the controller 230 into an LTE radio signal and transmits the LTE radio signal from the antenna. The receiver converts an LTE radio signal received by the antenna into a baseband signal (reception signal) and outputs the baseband signal to the controller 230.

The WLAN communication unit 220 performs WLAN communication under the control of the controller 230. The WLAN communication unit 220 may execute a part of a WLAN protocol. The WLAN communication unit 220 includes an antenna, a transmitter, and a receiver. The transmitter converts a baseband signal (transmission signal) output by the controller 230 into a WLAN radio signal and transmits the WLAN radio signal from the antenna. The receiver converts a WLAN radio signal received by the antenna into a baseband signal (reception signal) and outputs the baseband signal to the controller 230.

The controller 230 performs various types of control on the eNB 200. The controller 230 may execute a part of the LTE protocol, and may execute a part of the WLAN protocol. The controller 230 includes a processor and a memory. The memory stores a program executed by the processor, and information used for a process by the processor. The processor may include a baseband processor that performs modulation and demodulation, coding and decoding, and the like of the baseband signal, and a central processing unit (CPU) that performs a variety of processes by executing a program stored in the memory. The processor performs a variety of processes to be described later.

The backhaul communication unit 240 is connected to the adjacent eNB 200 via an X2 interface, connected to the EPC 500 (MME/S-GW) via an S1 interface, and connected to the WT 400 via an Xw interface. The backhaul communication unit 240 is used for communication performed on the X2 interface, communication performed on the S1 interface, communication performed on the Xw interface, and the like.

(Network Selection Operation)

The communication system according to the first embodiment performs a network selection operation (access network selection) of selecting a communication target network from among the WWAN (E-UTRAN) and the WLAN with respect to data of the UE 100. The network selection operation includes a terminal-based scheme in which the UE 100 selects the communication target network and a base station-based scheme in which the eNB 200 selects the communication target network.

Since the terminal-based scheme is introduced in Release 12 of the 3GPP standard, the terminal-based scheme may be referred to as a Release 12 method. On the other hand, since the base station-based scheme is scheduled to be introduced in Release 13 of the 3GPP standard, the base station-based scheme may be referred to as a Release 13 method.

(1) Terminal-Based Scheme

In the terminal-based mode, the UE 100 which is in the RRC connected state or the RRC idle state selects a communication target network from among the E-UTRAN and the WLAN, and performs bidirectional switching (traffic steering) between the E-UTRAN and the WLAN. This switching is performed in a UE-based manner with the aid of the E-UTRAN. In addition, the switching is performed in units of access point name (APN).

FIG. 5 is a diagram for describing the terminal-based scheme.

As illustrated in FIG. 5, in step S11, the eNB 200 transmits auxiliary information (RAN assistance parameters) to the UE 100 by broadcast RRC signaling or dedicated RRC signaling. The broadcast RRC signaling is, for example, a system information block (SIB) type 17. The dedicated RRC signaling is, for example, an "RRC connection reconfiguration" message.

The auxiliary information includes E-UTRAN signal strength (received power) thresholds and quality thresholds, WLAN channel utilization thresholds, WLAN backhaul data rate thresholds, WLAN signal strength (received power) thresholds and quality thresholds, and the like. The auxiliary information may include a WLAN identifier subject to the network selection operation. The WLAN identifier is a service set identifier (SSID), a homogeneous extended service set identifier (HESSID), basic service set identifier (BSSID), or the like. The auxiliary information may include a parameter specifying a period over which the threshold (determination condition) should be satisfied. The UE 100 receives the auxiliary information and stores the received auxiliary information.

In step S12, the UE 100 performs a network selection operation.

First, the switching from the E-UTRAN to the WLAN will be described. Based on a first determination condition on the E-UTRAN and a second determination condition on the WLAN, the UE 100 performs switching determination as to whether to switch from the E-UTRAN to the WLAN. Specifically, if both the first determination condition and the second determination condition are satisfied, the UE 100 performs switching from the E-UTRAN to the WLAN.

The first determination condition is the following condition for an E-UTRAN serving cell.

RSRPmeas<ThreshServingOffloadWLAN, LowP; or
RSRQmeas<ThreshServingOffloadWLAN, LowQ;

Here, "RSRPmeas" is received power of an LTE reference signal measured by the UE 100, that is, reference signal received power (RSRP). "RSRQmeas" is reception quality of the LTE reference signal measured by the UE 100, that is, reference signal received quality (RSRQ). "ThreshServing-OffloadWLAN, LowP" and "ThreshServingOffloadWLAN, LowQ" are thresholds included in the auxiliary information.

The second determination condition is the following condition for a target WLAN.

ChannelUtilizationWLAN<ThreshChUtilWLAN, Low; and
BackhaulRateD1WLAN>ThreshBackhRateDLWLAN, High; and
BackhaulRateU1WLAN>ThreshBackhRateULWLAN, High; and
BeaconRSSI>ThreshBeaconRSSIWLAN, High;

Here, "ChannelUtilizationWLAN" is included in a WLAN beacon or probe response and indicates a WLAN channel utilization rate, that is, a WLAN radio load level. "BackhaulRateD1WLAN" and "BackhaulRateU1WLAN" are provided by an access network query protocol (ANQP) and indicate an available transmission rate of the WLAN backhaul, that is, a WLAN backhaul load level. "BeaconRSSI" indicates a WLAN signal strength measured by the UE 100. "ThreshChUtilWLAN, Low", "Thresh-BackhRateDLWLAN, High", "ThreshBackhRateULW-LAN, High", and "ThreshBeaconRSSIWLAN, High" are thresholds included in the auxiliary information.

Next, an example of switching from the WLAN to the E-UTRAN will be described. Based on a third determination condition on the WLAN and a fourth determination condition on the E-UTRAN, the UE 100 performs switching determination as to whether to switch from the WLAN to the E-UTRAN. Specifically, if one of the third determination condition and the fourth determination condition is satisfied, the UE 100 performs switching from the WLAN to the E-UTRAN.

The third determination condition is the following condition for a source WLAN.

ChannelUtilizationWLAN>ThreshChUtilWLAN, High; or
BackhaulRateD1WLAN<ThreshBackhRateDLWLAN, Low; or
BackhaulRateU1WLAN<ThreshBackhRateULWLAN, Low; or
BeaconRSSI<ThreshBeaconRSSIWLAN, Low;

Here, "ThreshChUtilWLAN, High", "ThreshBackhRat-eDLWLAN, Low", "ThreshBackhRateULWLAN, Low", and "ThreshBeaconRSSIWLAN, Low" are thresholds included in the auxiliary information.

The fourth determination condition is the following condition for an E-UTRAN target cell.

RSRPmeas>ThreshServingOffloadWLAN, HighP; and
RSRQmeas>ThreshServingOffloadWLAN, HighQ;

Here, "ThreshServingOffloadWLAN, HighP" and "ThreshServingOffloadWLAN, HighQ" are thresholds included in the auxiliary information.

If a switching condition from the E-UTRAN to the WLAN or a switching condition from the WLAN to the E-UTRAN is satisfied, the AS layer (first entity) of the UE 100 notifies an upper layer (second entity) that the switching condition is satisfied. Here, the upper layer is, for example, the NAS layer (or the application layer).

(2) Base Station-Based Scheme

In the base station-based scheme, the eNB 200 selects a communication target network of the UE 100 from among the E-UTRAN and the WLAN based on a measurement report from the UE 100 and transmits, to the UE 100, a switching command for switching the communication target network.

A specific example of the base station-based scheme will be described below.

The eNB 200 transmits, to the UE 100, a WLAN measurement configuration for configuring the WLAN measurement report. For example, the eNB 200 includes the WLAN measurement configuration in an "RRC connection reconfiguration" message which is a dedicated RRC signaling addressed to the UE 100. The UE 100 receives the WLAN measurement configuration from the eNB 200. The WLAN measurement configuration includes a predetermined identifier associated with the WLAN AP group to be measured. The predetermined identifier is associated with the identifier of each WLAN AP 300 in the WLAN AP group to be measured.

(2.1) Operation Pattern 1

In the operation pattern 1 of the base station-based scheme, the predetermined identifier is an identifier of a measurement object configuration for configuring an object to be measured. Such an identifier of the measurement object configuration is referred to as measurement object identifier (measObjectId).

Also, in the operation pattern 1 of the base station-based scheme, the WLAN measurement configuration includes an index of each WLAN AP 300 in the WLAN AP group to be measured. The index has a shorter bit length than the identifier of the WLAN AP 300. The identifier of the WLAN AP 300 (WLAN identifier) is, for example, SSID, HESSID, or BSSID.

A signaling overhead can be reduced by introducing a shorter index than the identifier of the WLAN AP 300, apart from the identifier of the WLAN AP 300, and transmitting/receiving the index. For example, when only part of the WLAN AP 300 is removed from the measurement object, the removal can be commanded by using the index.

(2.1.1) Operation Pattern 1A

In the operation pattern 1A of the base station-based scheme, the WLAN measurement configuration further includes an identifier of each WLAN AP 300 in the WLAN AP group to be measured.

FIG. 6 is a sequence diagram illustrating the operation pattern 1A of the base station-based scheme. FIG. 7 is a diagram illustrating the architecture of the WLAN measurement configuration. FIG. 8 is a diagram illustrating a specific example of the WLAN measurement configuration in the operation pattern 1A of the base station-based scheme. Note that "Need ON" in FIG. 8 indicates that the parameter is optional, and if there is no value corresponding to the parameter, the UE 100 continues to use the currently configured value.

As illustrated in FIG. 6, in step S101, the eNB 200 transmits the WLAN measurement configuration to the UE 100. The UE 100 receives the WLAN measurement configuration.

As illustrated in FIG. 7, the WLAN measurement configuration (MeasConfig) includes a measurement object (MeasObject), a reporting configuration (ReportConfig), and a measurement identifier (MeasID). The measurement identifier (MeasID) associates the measurement object (MeasObject) with the reporting configuration (ReportConfig). Specifically, the measurement identifier (MeasID) indicates a combination of the identifier (MeasObjectID) of the measurement object (MeasObject) configuration and the identifier (ReportConfigID) of the reporting configuration (ReportConfig), and identifies a combination of the measurement object to be measured by the UE 100 and the reporting configuration.

As illustrated in FIG. 8, the measurement object (MeasObject) included in the WLAN measurement configuration (MeasConfig) includes a list of measurement objects to be removed (MeasObjectToRemoveList) and a list of measurement objects to be added or modified (MeasObjectToAddModList).

Each measurement object (MeasObjectToAddMod) included in the list of measurement objects to be added or modified (MeasObjectToAddModList) includes a measurement object identifier (measObjectId) and a measurement object (measObject). The measurement object (measObject) includes a measurement object WLAN (MeasObject WLAN).

The measurement object WLAN (MeasObjectWLAN) includes a measurement object WLAN frequency (wlancarrierFreq), a list of WLAN APs to be removed from the measurement object (wlansToRemoveList), and a list of WLAN APs to be added to the measurement object or modified (wlansToAddModList). FIG. 8 illustrates an example in which the measurement object WLAN frequency (wlancarrierFreq) is 2.4 GHz or 5 GHz. The list of WLAN APs to be removed from the measurement object (wlansToRemoveList) includes a list of indices of the WLAN APs (wlanIndexList).

Each WLAN AP information (WlansToAddMod) included in the list of WLAN APs to be added to the measurement object or modified (wlansToAddModList) includes an index (wlanIndex) and an identifier (wlanIdentifiers-r13) of each WLAN AP.

The reporting configuration (ReportConfig) included in the WLAN measurement configuration (MeasConfig) includes a trigger type (TriggerType) of the WLAN measurement report and the like. In the first embodiment, "event trigger reporting" that transmits the WLAN measurement report upon occurrence of an event is mainly assumed. Such an event includes an event that the quality of the WLAN becomes higher than the threshold and an event that the quality of the WLAN becomes lower than the threshold. Alternatively, the event may be an event that the quality of the LTE becomes lower than the threshold 1 and the quality of the WLAN becomes higher than the threshold 2. The event may be an event that the quality of the LTE becomes higher than the threshold 1 and the quality of the WLAN becomes lower than the threshold 2. The event may be an event that the quality of the current WLAN becomes lower than the threshold 1 and the quality of another WLAN becomes higher than the threshold 2.

In the situation illustrated in FIG. 1, it is assumed that the eNB 200 wants to know that the UE 100 moves to the coverage of the WLAN AP group B. In this case, the eNB 200 includes the measurement object identifier (measObjectId) and the measurement object (measObject) corresponding to the WLAN AP group B in the list of measurement objects to be added or modified (MeasObjectToAddModList). In addition, the eNB 200 combines the reporting configuration (ReportConfig) including the event that the quality of the WLAN becomes higher than the threshold with the measurement object identifier (measObjectId) corresponding to the WLAN AP group B. Therefore, when the quality of the WLAN AP 300 included in the WLAN AP group B becomes higher than the threshold, the UE 100 transmits, to the eNB 200, the WLAN measurement report related to the WLAN AP 300.

As illustrated in FIG. 6, in step S102, the UE 100 performs measurement indicated by the measurement identifier (MeasID) based on the WLAN measurement configuration (MeasConfig). Specifically, the UE 100 performs WLAN measurement on the measurement object WLAN (MeasObjectWLAN) corresponding to the measurement identifier (MeasID). Examples of the measurement parameter for the WLAN measurement include "ChannelUtilizationWLAN", "BackhaulRateD1WLAN", "BackhaulRateU1WLAN", and "BeaconRSSI". "ChannelUtilizationWLAN" is included in the WLAN beacon or probe response and indicates the WLAN channel utilization, that is, the WLAN radio load level. "BackhaulRateD1WLAN" and "BackhaulRateU1WLAN" are provided by the access network query protocol (ANQP) and indicate the available transmission rate of the WLAN backhaul, that is, the WLAN backhaul load level. "BeaconRSSI" indicates the WLAN signal strength measured by the UE 100. The type of measurement parameter in WLAN measurement may be specified by the reporting configuration (ReportConfig).

In step S103, the UE 100 determines that the event specified by the reporting configuration (ReportConfig) has occurred, based on the WLAN measurement.

In step S104, the UE 100 transmits the WLAN measurement report to the eNB 200. The eNB 200 receives the WLAN measurement report. The WLAN measurement report includes the measurement identifier (MeasID), the WLAN AP identifier (WLAN identifier), the WLAN measurement result, and the like. Since the measurement identifier (MeasID) is associated with the measurement object identifier (measObjectId), the eNB 200 can identify the WLAN AP group based on the measurement identifier (MeasID). Alternatively, the WLAN measurement report may include the measurement object identifier (measObjectId). Alternatively, in order to reduce the signaling overhead, the WLAN measurement report may include the index of the WLAN AP (WLAN index) instead of the WLAN AP identifier (WLAN identifier).

Based on the WLAN measurement report, the eNB 200 grasps that the UE 100 has moved to the coverage of the WLAN AP group to be measured. In addition, the eNB 200 determines the WLAN AP 300 to perform WLAN communication with the UE 100 among the WLAN APs 300 included in the WLAN AP group to be measured.

In step S105, the eNB 200 transmits, to the UE 100, the switching command including the identifier of the determined WLAN AP 300 (WLAN identifier). Here, instead of the identifier of the WLAN AP (WLAN identifier), the index of the WLAN AP (WLAN index) may be used. The UE 100 receives the switching command. Such a switching command may be referred to as "steering command" In the first embodiment, it is assumed that the switching command is a command for switching the WLAN communication from one WLAN AP 300 to another WLAN AP 300. Specifically, the switching command may be a command for switching the WLAN communication from the WLAN AP 300 belonging to one WLAN AP group to the WLAN AP 300 belonging to another WLAN AP group. However, the switching command may be a command for switching the communication (data) from the eNB 200 to the WLAN AP 300. Alternatively, the switching command may be a command for starting "WLAN aggregation" in which the UE 100 performs communication with the eNB 200 and communication with the AP 300 at the same time. The "WLAN aggregation" start command may be transmitted from the eNB 200 to the UE 100 via the "RRC connection reconfiguration" message.

In step S106, the UE 100 performs switching to the WLAN AP 300 specified by the switching command. The UE 100 may transmit, to the eNB 200, an affirmative reply or a negative reply to the switching command.

(2.1.2) Operation Pattern 1B

In the operation pattern 1B of the base station-based scheme, the eNB 200 transmits, to the UE 100, notification information different from the WLAN measurement configuration in a broadcast or unicast manner. The notification information includes an index and an identifier of each of the plurality of WLAN APs 300. The UE 100 receives the notification information. Alternatively, the UE 100 may receive the notification information from the EPC 500 (core network) via the eNB 200. For example, the UE 100 receives the notification information from an access network discovery and selection function (ANDSF) provided in the EPC 500.

As such, the UE 100 is notified of the correspondence relation between the index and the identifier of each of the WLAN APs 300 separately from the WLAN measurement configuration. Therefore, it is not necessary to include the identifier of the WLAN AP 300 in the WLAN measurement configuration, and the index of the WLAN AP 300 only needs to be included in the WLAN measurement configuration. Thus, the size of the WLAN measurement configuration (specifically, MeasObjectWLAN) can be reduced. In particular, if the WLAN measurement configuration (specifically, MeasObjectWLAN) is frequently updated, the effect of reducing the signaling overhead is great.

FIG. 9 is a sequence diagram illustrating the operation pattern 1B of the base station-based scheme. Here, differences from the operation pattern 1A of the base station-based scheme will be mainly described.

As illustrated in FIG. 9, in step S131, the eNB 200 transmits, to the UE 100, notification information including the index and the identifier of each of the plurality of WLAN APs 300 existing in the eNB's own coverage in a broadcast or unicast manner. The UE 100 receives the notification information and stores the received notification information.

In the case of the broadcast transmission, the eNB 200 includes the notification information in, for example, the system information block (SIB). If the WLAN AP group is shared rather than dedicated to the UE, that is, if the grouping of the WLAN AP is common to all UEs 100 within the cell, provision using the SIB results in resource reduction. On the other hand, in the case of the unicast transmission, the eNB 200 includes the notification information in the "RRC connection reconfiguration" message which is the dedicated RRC signaling addressed to the UE 100.

In step S132, the eNB 200 transmits the WLAN measurement configuration to the UE 100. The UE 100 receives the WLAN measurement configuration. In the operation pattern 1B of the base station-based scheme, the WLAN measurement configuration (specifically, MeasObjectWLAN) includes the index of the WLAN AP 300, but does not include the identifier of the WLAN AP 300. The other points are similar to the WLAN measurement configuration in the operation pattern 1A. Based on the stored notification information, the UE 100 derives a WLAN identifier corresponding to the index of the WLAN AP 300 included in the WLAN measurement configuration.

The subsequent operations (steps S133 to S137) are similar to those of the operation pattern 1A of the base station-based scheme.

(2.2) Operation Pattern 2

In the operation pattern 2 of the base station-based scheme, a predetermined identifier associated with the WLAN AP group to be measured is a group identifier of the WLAN AP group to be measured.

(2.2.1) Operation Pattern 2A

In the operation pattern 2A of the base station-based scheme, the WLAN measurement configuration includes the identifier of each WLAN AP 300 in the WLAN AP group to be measured.

FIG. 10 is a sequence diagram illustrating the operation pattern 2A of the base station-based scheme. Here, differences from the operation pattern 1A of the base station-based scheme will be mainly described.

As illustrated in FIG. 10, in step S151, the eNB 200 transmits the WLAN measurement configuration to the UE 100. The UE 100 receives the WLAN measurement configuration.

In the operation pattern 2A of the base station-based scheme, the measurement object (MeasObject) included in the WLAN measurement configuration (MeasConfig) includes a list of measurement objects to be removed (MeasObjectToRemoveList) and a list of measurement objects to be added or modified (MeasObjectToAddModList).

Each measurement object (MeasObjectToAddMod) included in the list of measurement objects to be added or modified (MeasObjectToAddModList) includes a measurement object identifier (measObjectId) and a measurement object (measObject). The measurement object (measObject) includes a measurement object WLAN (MeasObjectWLAN). The measurement object WLAN (MeasObjectWLAN) includes a group identifier.

The measurement object WLAN (MeasObjectWLAN) includes a measurement object WLAN frequency (wlancarrierFreq), a list of WLAN APs to be removed from the measurement object (wlansToRemoveList), and a list of WLAN APs to be added to the measurement object or modified (wlansToAddModList). The list of WLAN APs to be removed from the measurement object (wlansToRemoveList) includes a list of indices of the WLAN APs (WLAN identifiers). Each WLAN AP information (WlansToAddMod) included in wlansToAddModList includes the identifier of each WLAN AP (wlan-Identifiers-r13).

In step S152, the UE 100 performs measurement indicated by the measurement identifier (MeasID) based on the WLAN measurement configuration (MeasConfig). Specifically, the UE 100 performs WLAN measurement on the measurement object WLAN (MeasObjectWLAN) corresponding to the measurement identifier (MeasID).

In step S153, the UE 100 determines that the event specified by the reporting configuration (ReportConfig) has occurred, based on the WLAN measurement.

In step S154, the UE 100 transmits the WLAN measurement report to the eNB 200. The eNB 200 receives the WLAN measurement report. The WLAN measurement report includes the group identifier, the WLAN AP identifier (WLAN identifier), the WLAN measurement result, and the like. The eNB 200 can identify the WLAN AP group based on the group identifier. Note that the WLAN measurement report includes the WLAN AP identifier (WLAN identifier), but may not include the group identifier. This is because, if the eNB 200 can uniquely specify the WLAN AP group by receiving the WLAN identifier, there is a possibility that the group identifier will not be needed. Alternatively, the WLAN measurement report includes the group identifier, but may not include the WLAN identifier. This is because, if the UE 100 is initially connected to the WLAN, there is a possibility that the UE 100 will not need the WLAN identifier.

Based on the WLAN measurement report, the eNB 200 grasps that the UE 100 has moved to the coverage of the WLAN AP group to be measured. In addition, the eNB 200 determines the WLAN AP 300 to perform WLAN communication with the UE 100 among the WLAN APs 300 included in the WLAN AP group to be measured.

In step S155, the eNB 200 transmits, to the UE 100, a switching command including the identifier of the determined WLAN AP 300 (WLAN identifier). The UE 100 receives the switching command. Alternatively, in order to reduce the signaling overhead, the switching command may include the group identifier instead of the identifier of the WLAN AP (WLAN identifier). In addition, when assuming a special case where, for example, one WLAN AP belongs to two or more groups, there is a risk that the UE 100 will freely communicate with a plurality of groups one after another via the one WLAN AP. In the switching command, it is expected to prevent such an operation by explicitly specifying the "group" to which the traffic is to be transferred.

In step S156, the UE 100 performs switching to the WLAN AP 300 specified by the switching command (or the specified WLAN AP group). Alternatively, the switching command may be a command for starting "WLAN aggregation" in which the UE 100 performs communication with the eNB 200 and communication with the AP 300 at the same time. The UE 100 may transmit, to the eNB 200, an affirmative reply or a negative reply to the switching command.

(2.2.2) Operation Pattern 2B

In the operation pattern 2B of the base station-based scheme, the eNB 200 transmits, to the UE 100, notification information different from the WLAN measurement configuration in a broadcast or unicast manner. The notification information includes the group identifier of the WLAN AP group and the identifier of each WLAN AP 300 in the WLAN AP group. The UE 100 receives the notification information. Alternatively, the UE 100 may receive the notification information from the EPC 500 (core network) via the eNB 200. For example, the UE 100 receives the notification information from an ANDSF provided in the EPC 500.

In this manner, the UE 100 is notified of, separately from the WLAN measurement configuration, the correspondence relation between the group identifier of the WLAN AP group and the identifier of each WLAN AP 300 in the WLAN AP group. Therefore, it is not necessary to include the identifier of the WLAN AP 300 in the WLAN measurement configuration, and the group identifier of the WLAN AP group to be measured only needs to be included in the WLAN measurement configuration. Thus, the size of the WLAN measurement configuration (specifically, MeasObjectWLAN) can be reduced. In particular, if the WLAN measurement configuration (specifically, MeasObjectWLAN) is frequently updated, the effect of reducing the signaling overhead is great.

FIG. 11 is a sequence diagram illustrating the operation pattern 2B of the base station-based scheme. Here, differences from the operation pattern 2A of the base station-based scheme will be mainly described.

As illustrated in FIG. 11, in step S171, the eNB 200 transmits, to the UE 100, notification information including the group identifier of the WLAN AP group existing in the eNB's own coverage and the identifier of each WLAN AP 300 in the WLAN AP group in a broadcast or unicast manner. The UE 100 receives the notification information and stores the received notification information.

In the case of the broadcast transmission, the eNB 200 includes the notification information in, for example, the system information block (SIB). On the other hand, in the case of the unicast transmission, the eNB 200 includes the notification information in the "RRC connection reconfiguration" message which is the dedicated RRC signaling addressed to the UE 100.

In step S172, the eNB 200 transmits the WLAN measurement configuration to the UE 100. The UE 100 receives the WLAN measurement configuration. In the operation pattern 2B of the base station-based scheme, the WLAN measurement configuration (specifically, MeasObjectWLAN) includes the group identifier of the WLAN AP group to be measured, but does not include the identifier of the WLAN AP 300. The other points are similar to the WLAN measurement configuration in the operation pattern 2A. Based on the stored notification information, the UE 100 derives each WLAN identifier corresponding to the group identifier included in the WLAN measurement configuration.

The subsequent operations (steps S173 to S177) are similar to those of the operation pattern 2A of the base station-based scheme.

(2.3) Operation of UE 100 Having Received Switching Command

The operation of the UE 100 having received a switching command from the eNB 200 will be described below. FIG. 12 is a sequence diagram illustrating the operation of the UE 100 having received the switching command.

As illustrated in FIG. 12, the UE 100 includes a first entity 131 that performs WWAN communication with the eNB 200, and a second entity 132 that is located at a higher layer than the first entity 131. The first entity 131 and the second entity 132 are included in the controller 130 of the UE 100. The first entity 131 is an AS layer entity. The first entity 131 may be an RRC layer entity in the AS layer entity. The second entity 132 is a NAS layer entity. The second entity 132 may be an application layer entity.

In step S191, the first entity 131 receives, from the eNB 200, the switching command for switching the communication target network between the WWAN (E-UTRAN) and the WLAN with respect to the data of the UE 100. The switching command is transmitted from the eNB 200 by the dedicated RRC signaling (for example, "RRC connection reconfiguration" message) addressed to the UE 100. Here, the command for switching (offload) from the E-UTRAN to the WLAN is assumed. The switching command includes an identifier related to a WLAN to be connected. The identifier related to a WLAN to be connected is at least one of the identifier of the WLAN AP 300 (WLAN identifier), the index of the WLAN AP 300 (WLAN index), and the identifier of the WLAN AP group (group identifier). The switching command may also include a bearer identifier of an object to be switched (offload object). The bearer identifier is at least one of an evolved packet system (EPS) bearer ID, a data radio bearer (DRB) ID, and an E-RAB ID.

Alternatively, the switching command may include information about the APN of the object to be switched (offload object).

In step S192, the first entity 131 notifies the second entity 132 of an indicator (move-traffic-to-WLAN) indicating the switching of the communication target network in response to reception of the switching command from the eNB 200.

In the communication system according to the first embodiment, the terminal-based scheme in which the first entity 131 performs the network selection to select the communication target network from among the WWAN and the WLAN, and the base station-based scheme in which the eNB 200 performs the network selection are defined. If the switching command is received from the eNB 200, the first entity 131 notifies the second entity 132 of an indicator capable of identifying that the base station-based scheme is applied.

Here, the indicator capable of identifying that the base station-based scheme is applied is an indicator dedicated to the base station-based scheme. For example, the indicator is move-traffic-to-WLAN-r13.

Alternatively, the indicator capable of identifying that the base station-based scheme is applied is obtained by adding information indicating the base station-based scheme to the indicator in the terminal-based scheme. For example, the first entity 131 adds a "preference indicator" to move-traffic-to-WLAN (indicator in the terminal-based scheme) of Release 12. The "preference indicator" is, for example, a special offload preference indicator (OPI).

In this manner, by notifying the second entity 132 of the indicator capable of identifying that the base station-based scheme is applied, the second entity 132 can appropriately determine whether to switch the communication target network. Specifically, if the switching of the communication target network is commanded by the base station-based scheme, it can be determined that the necessity to switch the communication target network is high, and the process of switching the communication target network can be performed.

In addition, if the switching command instructs the switching from the WWAN to the WLAN, the switching command includes the identifier related to the WLAN to be connected. When notifying the second entity 132 of the indicator, the first entity 131 notifies the second entity 132 of the identifier related to the WLAN to be connected, which is included in the switching command. Further, when notifying the second entity 132 of the indicator, the first entity 131 may notify the second entity 132 of the bearer identifier included in the switching command. When notifying the second entity 132 of the indicator, the first entity 131 may notify the second entity 132 of APN information included in the switching command.

In response to the reception of the indicator from the first entity 131, the second entity 132 determines whether to switch the communication target network from the WWAN to the WLAN. If the second entity 132 determines that the communication target network is switched from the WWAN to the WLAN, the second entity 132 performs a process of switching the communication target network from the WWAN to the WLAN by connecting to the WLAN to be connected based on the identifier related to the WLAN to be connected. The switching of the communication target network is performed in APN units. However, if the bearer identifier is included in the switching command, the second entity 132 may switch the communication target network of only the bearer indicated by the bearer identifier.

In step S193, the second entity 132 notifies the first entity 131 of the response. The response may include at least one bearer identifier that has executed (or has determined to execute) the switching (offload). The response may include at least one bearer identifier that cannot execute the switching (offload), in place of or in addition to such a bearer identifier.

In step S194, the first entity 131 notifies the eNB 200 of the response based on the response from the second entity 132.

For example, if the connection to the WLAN is notified from the second entity 132, the first entity 131 transmits, to the eNB 200, a report (WLAN connection complete report) indicating the connection to the WLAN.

Alternatively, if non-compliance with the switching command and its cause are notified from the second entity 132, the first entity 131 transmits, to the eNB 200, information (cause value) indicating the cause for not following the switching command Examples of the "cause value" include "notOffloadablePDNconnection", "upplerLayerDecision", and "ANDSFConfliction". Here, "notOffloadablePDNconnection" is used when the switching is not possible because of a packet data network (PDN) connection in which offload is not permitted. Note that the PDN connection is almost synonymous with the APN. "UpplerLayerDecision" is used when the switching is not possible due to an arbitrary decision of the second entity 132. "ANDSFConfliction" is used when the determination of the ANDSF does not match the contents of the switching command.

Alternatively, if the connection to the WLAN different from the connection target WLAN specified by the switching command and the identifier related to the connected WLAN are notified from the second entity 132, the first entity 131 may transmit, to the eNB 200, the identifier related to the connected WLAN. The identifier related to the connected WLAN is at least one of the WLAN identifier, the WLAN index, and the group identifier.

In addition, if at least one of the identifier of the bearer to be switched by the second entity 132 and the identifier of the bearer not to be switched by the second entity 132 is notified from the second entity 132, the first entity 131 may transmit, to the eNB 200, the identifier of the bearer to be switched and the identifier of the bearer not to be switched.

Note that the message in step S194 is not limited to the response to the command in step S191 (for example, the "RRC connection reconfiguration complete" message). The message in step S194 may be a message spontaneously transmitted by the UE 100 (for example, a "UE assistance information" message or the like).

Second Embodiment

In a second embodiment, differences from the first embodiment will be described below.

An eNB 200 according to the second embodiment performs network selection to select a communication target network from among a WWAN (E-UTRAN) and a WLAN with respect to data of a UE 100, and transmits, to the UE 100, a switching command for switching the communication target network between the WWAN and the WLAN, based on a result of the network selection. The eNB 200 performs network selection based on predetermined information acquired from a specific apparatus different from the UE 100. Specifically, the eNB 200 determines whether to switch to the WLAN, based on the predetermined information.

In an operation pattern 1 of the second embodiment, the specific apparatus is a core network apparatus provided in a core network (EPC 500) of the WWAN. The predetermined information is bearer information indicating whether the data of the UE 100 is data belonging to a bearer that is switchable from WWAN to WLAN.

In the operation pattern 1 of the second embodiment, the eNB 200 acquires the bearer information from the core network apparatus upon establishment of the bearer or modification of the bearer.

In an operation pattern 2 of the second embodiment, the specific apparatus is a WLAN apparatus provided in the WLAN. The predetermined information is at least one of location information related to the WLAN AP, load information related to the WLAN AP, and performance information related to the WLAN AP.

(1) Operation Pattern 1

Figure 13:
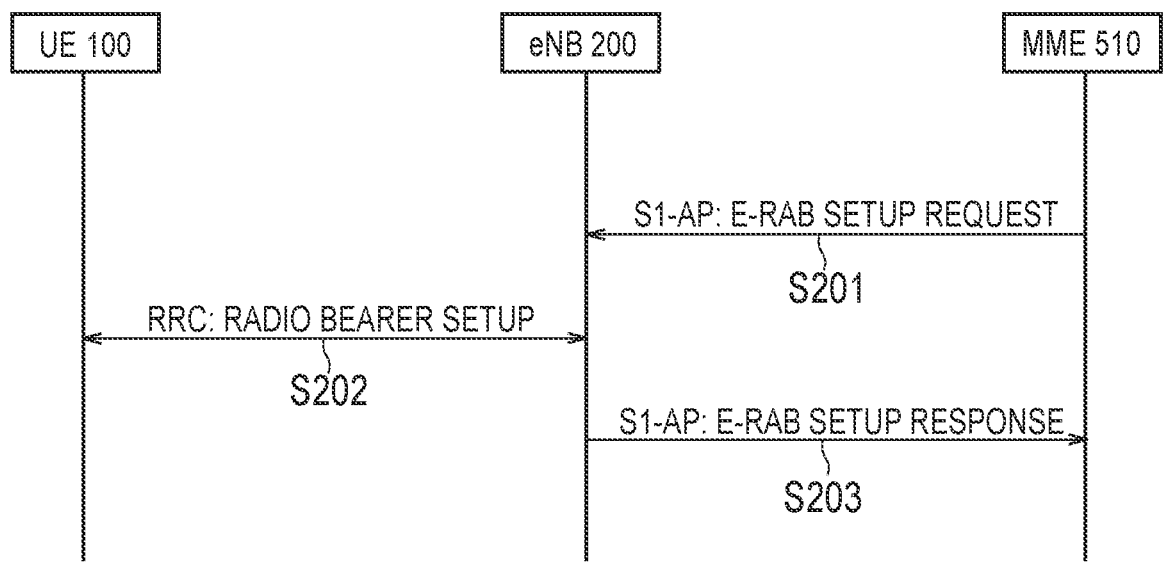
FIG. 13 is a sequence diagram illustrating an example of an operation pattern 1 of a second embodiment.

FIG. 13 is a sequence diagram illustrating an example of the operation pattern 1 of the second embodiment. Here, an example in which the core network apparatus is a mobility management entity (MME) 510 will be described.

As illustrated in FIG. 13, in step S201, the MME 510 transmits, to the eNB 200, a bearer establishment request (E-RAB SETUP REQUEST) for establishing a bearer (E-RAB: E-UTRAN radio access bearer). The E-RAB is a bearer established between the UE 100 and the S-GW (serving gateway). The E-RAB includes a data radio bearer (DRB) between the UE 100 and the eNB 200 and an S1 bearer between the eNB 200 and the S-GW. Note that the EPS bearer is configured by E-RAB and S5/S8 bearers. The S5/S8 bearer is a bearer between the S-GW and the P-GW (PDN gateway).

The bearer establishment request (E-RAB SETUP REQUEST) includes a list of E-RABs to be established (E-RAB To Be Setup List). The MME 510 includes a flag indicating whether the switching to the WLAN is possible in a bearer establishment request (E-RAB SETUP REQUEST) for each E-RAB. For example, the MME 510 sets "1" as the flag of the E-RAB that is switchable to the WLAN and sets "0" as the flag of the E-RAB which is not switchable to the WLAN. The eNB 200 stores information included in the bearer establishment request (E-RAB SETUP REQUEST). As a precondition of such operation, the MME 510 grasps the correspondence between the EPS bearer, the PDN connection (APN), and the E-RAB. Therefore, the MME 510 grasps the correspondence relationship between the E-RAB and the APN. In addition, the MME 510 grasps the information of the APN that is switchable (offloaded) to the WLAN, based on whether the P-GW has a connection capability with the network on the WLAN side, and restriction information and the like for each APN. Alternatively, the MME 510 may acquire, from a policy and charging rules function (PCRF), information related to the APN that is switchable to the WLAN.

In step S202, the eNB 200 establishes a data radio bearer and an S1 bearer in response to the reception of the bearer establishment request (E-RAB SETUP REQUEST).

In step S203, the eNB 200 transmits a bearer establishment response (E-RAB SETUP RESPONSE) to the MME 510.

The eNB 200 performs the network selection of the base station-based scheme described above. Since the eNB 200 grasps whether the E-RAB of the UE 100 is an E-RAB that is switchable to the WLAN, the eNB 200 can appropriately transmit, to the UE 100, a command (steering command) for switching to the WLAN. Specifically, the eNB 200 confirms whether the E-RAB of the UE 100 is switchable to the WLAN, and transmits, to the UE 100, a command for switching to the WLAN only when the E-RAB of the UE 100 is switchable to the WLAN. In addition, if the UE 100 has only one PDN connection (APN) and the E-RAB that is not offloadable is associated with the PDN connection, the eNB 200 does not transmit, to the UE 100, a command for switching to the WLAN. This makes it possible to avoid transmitting inappropriate switching commands. Alternatively, the eNB 200 may perform control not to transmit the WLAN measurement configuration to the UE 100, instead of control not to transmit, to the UE 100, the command for switching to the WLAN.

Figure 14:
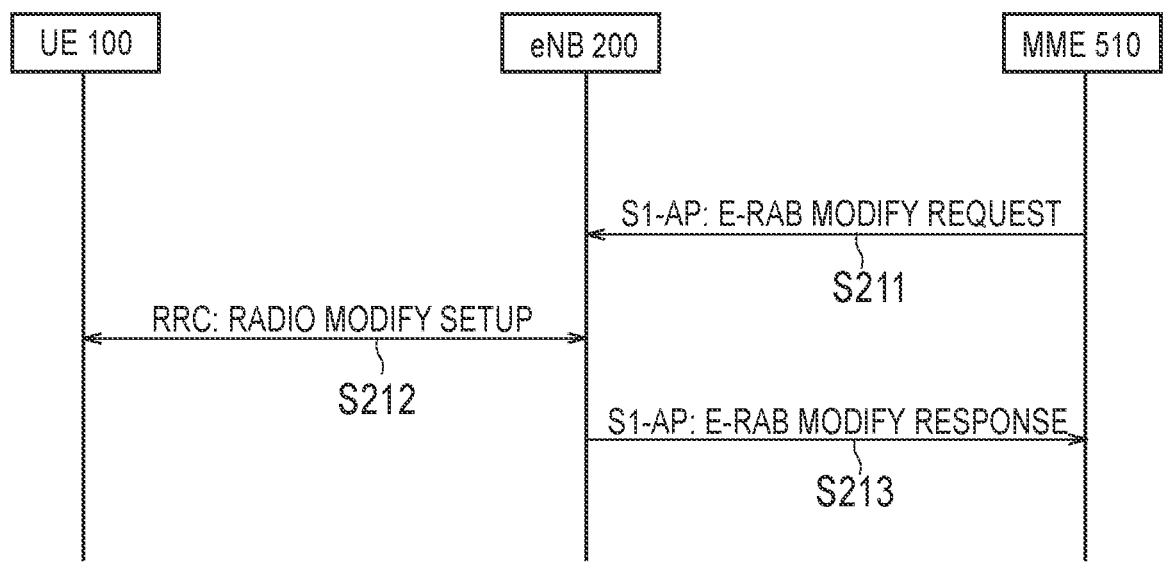
FIG. 14 is a sequence diagram illustrating another example of the operation pattern 1 of the second embodiment.

FIG. 13 is a sequence upon bearer establishment, but may be a sequence upon bearer modification. FIG. 14 is a sequence diagram illustrating another example of the operation pattern 1 of the second embodiment. Here, differences from FIG. 13 will be mainly described.

As illustrated in FIG. 14, in step S211, the MME 510 transmits, to the eNB 200, a bearer modification request (E-RAB MODIFY REQUEST) for modifying a bearer (E-RAB: E-UTRAN radio access bearer). The bearer modification request (E-RAB MODIFY REQUEST) includes a list of E-RABs to be modified (E-RAB To Be Modified List). The MME 510 includes a flag indicating whether the switching to the WLAN is possible in a bearer modification request (E-RAB MODIFY REQUEST) for each E-RAB. The eNB 200 stores information included in the bearer establishment request (E-RAB SETUP REQUEST).

In step S212, the eNB 200 modifies a data radio bearer and an S1 bearer in response to the reception of the bearer modification request (E-RAB MODIFY REQUEST).

In step S213, the eNB 200 transmits a bearer modification response (E-RAB MODIFY RESPONSE) to the MME 510.

In the operation pattern 1 of the second embodiment, the eNB 200 may determine whether to command the UE 100 to switch to the WLAN by taking into account the amount of transmission/reception data for each bearer. In addition to the determination as to whether the E-RAB is associated with an offloadable PDN connection, the determination as to whether the bearer deserves to command offloading is also taken into account, thereby expecting to realize a more efficient offload.

(2) Operation Pattern 2

Figure 15:
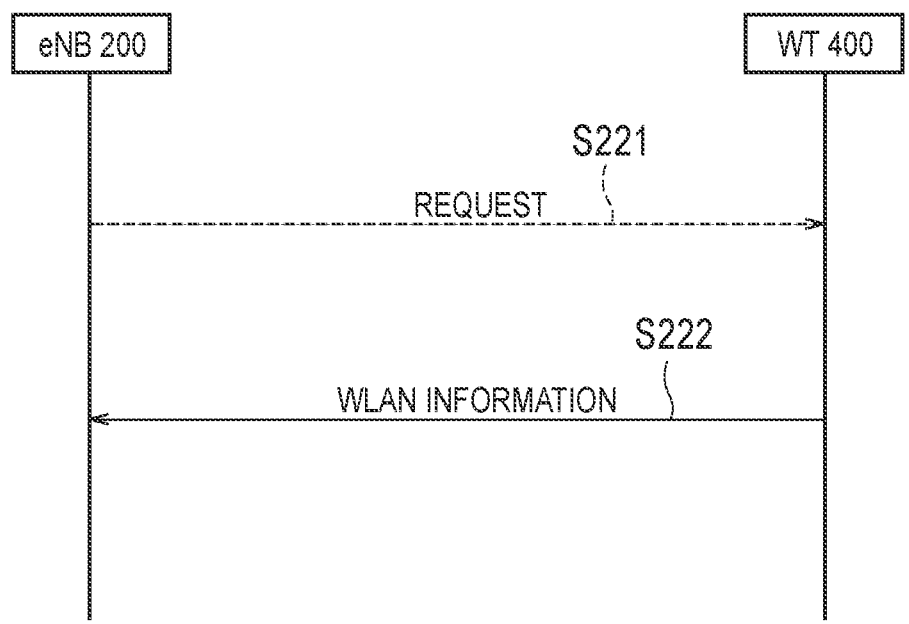
FIG. 15 is a sequence diagram illustrating an example of an operation pattern 2 of the second embodiment.

FIG. 15 is a sequence diagram illustrating an example of the operation pattern 2 of the second embodiment. Here, an example in which the WLAN apparatus is the WT 400 will be described.

As illustrated in FIG. 15, in step S221, the eNB 200 requests the WT 400 to transmit WLAN information. The WLAN information is information related to the WLAN AP 300 accommodated in the WT 400. The WLAN information may be information for each WLAN AP 300 or information for each WLAN AP group. The WLAN information is at least one of location information related to the WLAN AP 300, load information related to the WLAN AP 300, performance information related to the WLAN AP 300. The location information related to the WLAN AP 300 is information indicating the geographical location of the WLAN AP 300 or the group thereof. The load information related to the WLAN AP 300 is information indicating a load level (for example, the number of connected UEs) of the WLAN AP 300 or the group thereof. The performance information related to the WLAN AP 300 is information indicating the performance (for example, which series of IEEE 802.11) of the WLAN AP 300 or the group thereof. Note that step S221 is not essential and may be omitted.

In step S222, the WT 400 transmits the WLAN information to the eNB 200. The eNB 200 receives the WLAN information and stores the received WLAN information.

The eNB 200 performs the network selection of the base station-based scheme described above. Since the eNB 200 grasps information of the WLAN AP 300 to be switched or the group thereof, the eNB 200 can appropriately transmit, to the UE 100, a command for switching to the WLAN.

For example, based on the location information related to the WLAN AP 300 and the WLAN measurement report from the UE 100, the eNB 200 grasps the location of the WLAN AP 300 indicated by the WLAN measurement report or the group thereof. If the WLAN AP 300 indicated by the WLAN measurement report or the group thereof is located in a cell center region of the eNB 200, the eNB 200 commands the UE 100 to switch to the WLAN AP 300 or the group thereof. Note that the network selection of the terminal-based scheme may be applied to the UE 100 located in a cell edge region of the eNB 200. The network selection of the terminal-based scheme is characterized in that the UE 100 located in the cell edge region can easily select the WLAN, and the UE 100 located in the cell center region has difficulty in selecting the WLAN. Therefore, in a case where the terminal-based scheme and the base station-based scheme are used in combination, it is preferable to apply the base station-based scheme only to the UE 100 located in the cell center region.

Alternatively, based on the load information related to the WLAN AP 300 and the WLAN measurement report from the UE 100, the eNB 200 grasps the load level of the WLAN AP 300 indicated by the WLAN measurement report or the group thereof. If the load level of the WLAN AP 300 indicated by the WLAN measurement report or the group thereof is lower than a predetermined level, the eNB 200 commands the UE 100 to switch to the WLAN AP 300 or the group thereof.

Alternatively, based on the performance information related to the WLAN AP 300 and the WLAN measurement report from the UE 100, the eNB 200 grasps the performance of the WLAN AP 300 indicated by the WLAN measurement report or the group thereof. If the performance of the WLAN AP 300 indicated by the WLAN measurement report or the group thereof satisfies a predetermined condition (for example, required QoS), the eNB 200 commands the UE 100 to switch to the WLAN AP 300 or the group thereof.

[Modification Example of Second Embodiment]

In the second embodiment, the bearer establishment request (E-RAB SETUP REQUEST) and the bearer modification request (E-RAB MODIFY REQUEST) transmitted from the MME 510 to the eNB 200 have been described, but a bearer release command (E-RAB RELEASE COMMAND) transmitted from the MME 510 to the eNB 200 has not been mentioned.

However, since the MME 510 manages the switching from the WWAN to the WLAN, the MME 510 may command the eNB 200 to release the bearer by a bearer release command (E-RAB RELEASE COMMAND). Specifically, the MME 510 performs communication with the second entity 132 of the UE 100, grasps the switching to the WLAN, and transmits the bearer release command (E-RAB RELEASE COMMAND) to the eNB 200. In this case, step S194 in FIG. 12 may be unnecessary.

The bearer release command (E-RAB RELEASE COMMAND) includes a list of bearers to be released (E-RAB To Be Released List IE). Since Cause is included in the IE, the MME 510 sets "Steering to WLAN" as the Cause. The eNB 200 transmits the bearer release response (E-RAB RELEASE RESPONSE) to the MME 510 as a response to the bearer release command (E-RAB RELEASE COMMAND).

Conversely, if switching from the WLAN to the WWAN, the MME 510 transmits the bearer establishment request (E-RAB SETUP REQUEST) or the bearer modification request (E-RAB MODIFY REQUEST) to the eNB 200. The MME 510 configures "Steering from WLAN" as Cause in the list of bearers included in the bearer establishment request (E-RAB SETUP REQUEST) or the bearer modification request (E-RAB MODIFY REQUEST).

In this manner, the eNB 200 acquires, from the MME 510, information related to bearers switched between the WWAN and the WLAN.

Third Embodiment

In a third embodiment, differences from the first embodiment and the second embodiment will mainly be described below.

(Usage of WLAN Measurement Report)

In the first embodiment and the second embodiment described above, the UE 100 starts the WLAN measurement based on the WLAN measurement configuration from the eNB 200, and transmits the WLAN measurement report to the eNB 200 when a reporting condition is satisfied.

In addition, in the first embodiment and the second embodiment described above, the case where the WLAN measurement report is used for "WLAN/3GPP interworking enhancement" has been mainly described. However, the WLAN measurement report is also used for "LTE-WLAN aggregation" besides "WLAN/3GPP interworking enhancement".

Differences between the "WLAN/3GPP interworking enhancement" and the "LTE-WLAN aggregation" will be described below.

Figure 16:
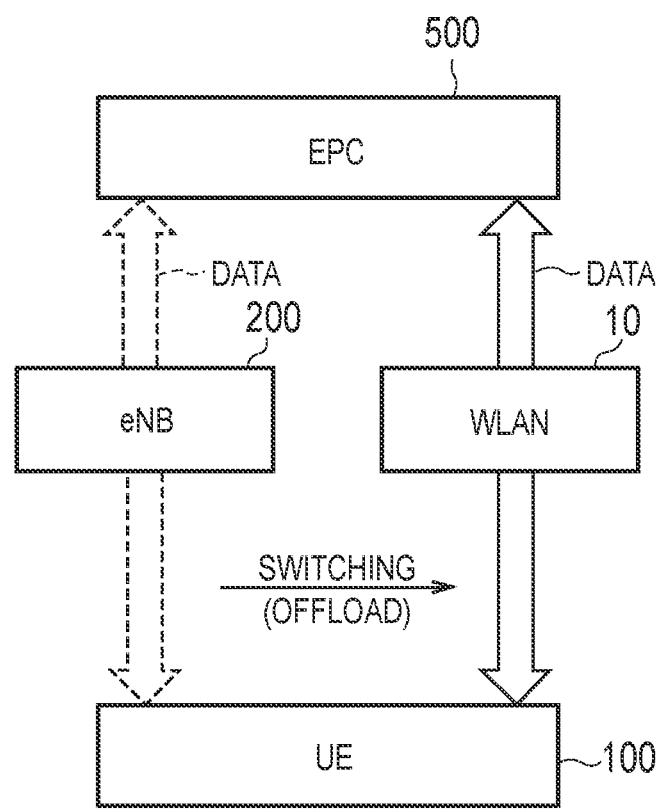
FIG. 16 is a diagram for describing "WLAN/3GPP interworking enhancement".

FIG. 16 is a diagram for describing the "WLAN/3GPP interworking enhancement".

As illustrated in FIG. 16, the eNB 200 transmits the switching command (steering command) to the UE 100 based on the WLAN measurement report from the UE 100. In response to the reception of the switching command (steering command), the UE 100 switches the network used for data communication of the UE 100 from the WWAN (eNB 200) to the WLAN 10. Such data switching is referred to as "offload".

Figure 17:
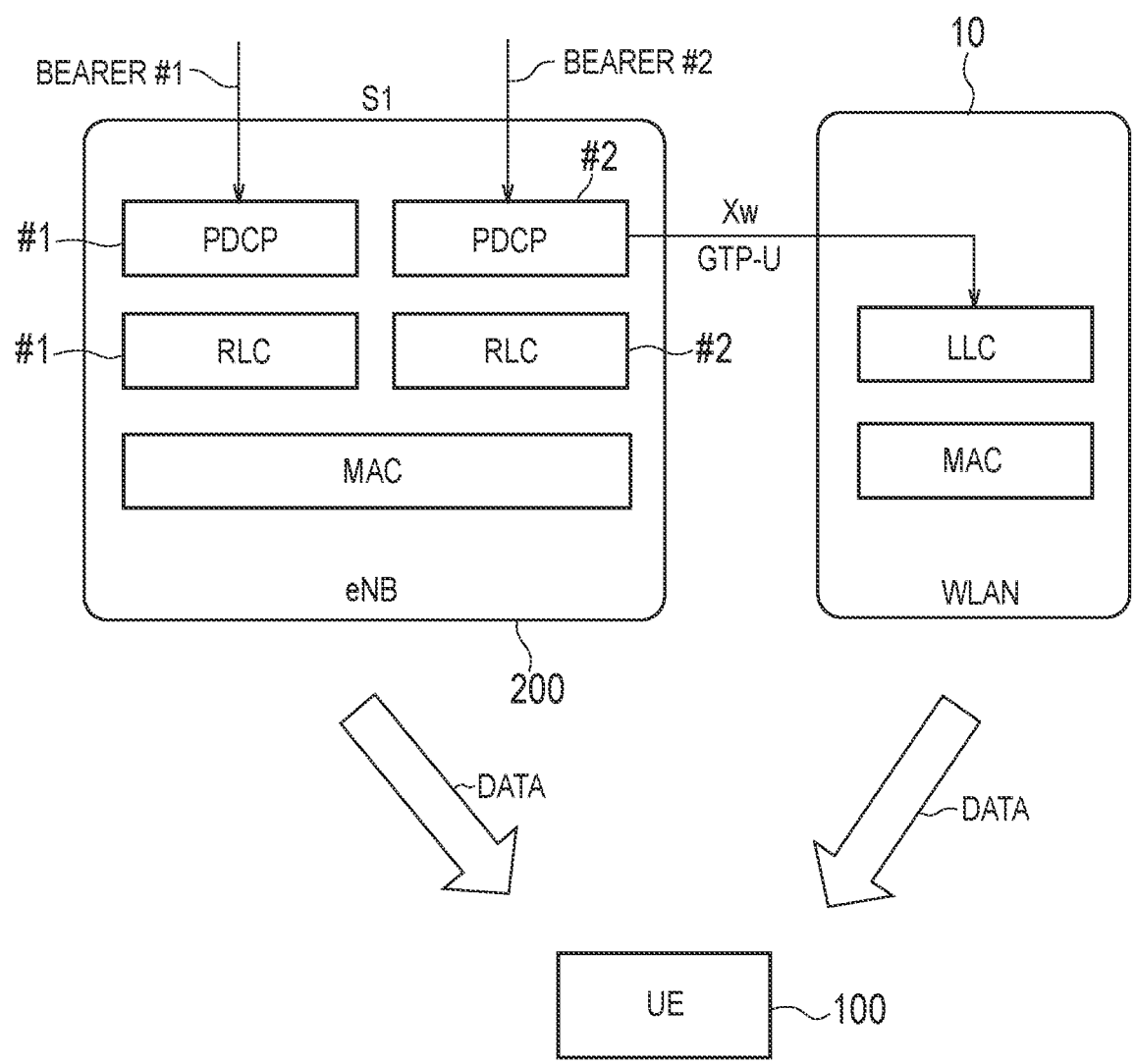
FIG. 17 is a diagram for describing "LTE-WLAN aggregation".

FIG. 17 is a diagram for describing the "LTE-WLAN aggregation". Although the "LTE-WLAN aggregation" of the downlink is described herein, the "LTE-WLAN aggregation" can also be applied to the uplink.

As illustrated in FIG. 17, the eNB 200 transmits an "RRC connection reconfiguration" message to the UE 100 based on the WLAN measurement report from the UE 100, and commands the start of the "LTE-WLAN aggregation". The UE 100 starts the "LTE-WLAN aggregation" in response to the reception of the switching command (steering command)

Specifically, in the "LTE-WLAN aggregation", the UE 100 simultaneously uses communication with the WWAN (eNB 200) and communication with the WLAN 10. In the example of FIG. 17, data of a bearer #1 of the UE 100 is transmitted from the eNB 200 to the UE 100. On the other hand, at least part of data of a bearer #2 of the UE 100 is transmitted from the eNB 200 to the UE 100 via the WLAN 10.

The eNB 200 includes an entity (PDCP entity) #1 of a PDCP layer corresponding to the bearer #1 and a PDCP entity #2 corresponding to the bearer #2. The PDCP entity

1 processes the data (PDCP SDU) of the bearer #1 transferred from the S-GW on the S1 interface and hands over the processed data (PDCP PDU) to the entity (RLC entity) #1 of the RLC layer. The RLC entity #1 processes the data from the PDCP entity #1 as an RLC SDU and hands over the processed data (RLC PDU) to the entity of the LTE MAC layer (LTE MAC entity). The LTE MAC entity processes the data from the RLC entity #1 as a MAC SDU and transmits the processed data (MAC PDU) to the UE 100 via an entity (not illustrated) of a physical layer.

The PDCP entity #2 processes data (PDCP SDU) of the bearer #2 transferred from the S-GW on the S1 interface and transmits at least part of the processed data (PDCP PDU) to the WLAN 10 on the Xw interface. On the Xw interface, the data of the UE 100 may be transferred by using GTP-U (GPRS Tunneling Protocol for User plane). IP tunneling may be used instead of GTP-U. The remaining PDCP PDUs are handed over to the RLC entity #2 and are transmitted to the UE 100 through the same process as the bearer #1.

The WLAN 10 includes an entity (WLAN LLC entity) of a WLAN logical link control (LLC) layer and an entity (WLAN MAC entity) of a WLAN medium access control (MAC) layer. The WLAN LLC entity processes the data (PDCP PDU) of the bearer #2 transferred from the eNB 200 and hands over the processed data to the WLAN MAC entity. The WWAN MAC entity processes the data from the WLAN LLC entity and transmits the processed data to the UE 100 via the entity (not illustrated) of the physical layer.

Note that an aggregation layer entity defined by the 3GPP standard may be provided instead of the WLAN LLC entity illustrated in FIG. 17. Alternatively, the data (PDCP PDU) of the bearer #2 transferred from the eNB 200 may be directly handed over to the WLAN MAC entity, without providing either the WLAN LLC entity or the aggregation layer entity.

(Operation According to Third Embodiment)

In the case of the "LTE-WLAN aggregation", since all data of the UE 100 is transmitted and received via the eNB 200, all data of the UE 100 can be regarded as offloadable data.

On the other hand, in the case of the "WLAN/3GPP interworking enhancement", as described above, even if the UE 100 receives the switching command (steering command), offloading cannot be executed when there is no offloadable data. Under circumstances in which there is no offloadable data, that the UE 100 performs WLAN measurement and WLAN measurement reporting for the "WLAN/3GPP interworking enhancement" may unnecessarily increase the power consumption and processing load of the UE 100.

Therefore, when the WLAN measurement configuration (MeasConfig) for configuring the WLAN measurement report is transmitted to the UE 100, the eNB 200 according to the third embodiment includes information related to the usage of the WLAN measurement report (hereinafter, referred to as "usage related information") in the WLAN measurement configuration. Examples of the usage of the WLAN measurement report include "WLAN/3GPP interworking enhancement" (specific usage), "LTE-WLAN aggregation", and other usages. Other usages include, for example, mobility robustness optimization (MRO).

The usage related information may be, for example, information directly indicating the usage of the WLAN measurement report, such as "00" in the case of the "WLAN/3GPP interworking enhancement", "01" in the case of the "LTE-WLAN aggregation", and "10" in the case of other uses. Also, the usage related information may be defined as information indicating the cause of the WLAN measurement configuration. Note that the usage related information is preferably added to the SEQUENCE of MeasObjectWLAN (see the bottom frame in FIG. 8). This is because it is thought that the usage needs to be clearly indicated only in the WLAN measurement.

Alternatively, the usage related information may be information indirectly indicating the usage of the WLAN measurement report, such as the event type included in the reporting configuration (ReportConfig) in the WLAN measurement configuration. For example, the event type such as "Event WI" in the case of the "WLAN/3GPP interworking enhancement" and "Event WA" in the case of the "LTE-WLAN aggregation" is used.

As described above, the UE 100 includes a first entity 131 that performs communication with the eNB 200, and a second entity 132 that is located at a higher layer than the first entity 131. Specifically, the first entity 131 is an AS layer entity. The first entity 131 may be an RRC layer entity in the AS layer entity. The second entity 132 is a NAS layer entity. The second entity 132 may be an application layer entity.

In the operation pattern 1 of the third embodiment, the first entity 131 receives, from the eNB 200, the WLAN measurement configuration including the usage related information. If the usage related information indicates the "WLAN/3GPP interworking enhancement" (specific usage), the first entity 131 inquires of the second entity 132 about the presence or absence of data that is switchable from the WWAN to the WLAN. The first entity 131 may notify the eNB 200 of the result of the inquiry to the second entity 132.

In the operation pattern 2 of the third embodiment, if the usage related information indicates the "WLAN/3GPP interworking enhancement" and the measurement result for the WLAN satisfies the transmission condition of the WLAN measurement report (reporting condition), the first entity 131 inquires of the second entity 132 about the presence or absence of data that is switchable from the WWAN to the WLAN. Then, if the result of the inquiry to the second entity 132 indicates that the data switchable from the WWAN to the WLAN is present, the first entity 131 transmits the WLAN measurement report to the eNB 200. On the other hand, if the result of the inquiry to the second entity 132 indicates that the data switchable from the WWAN to the WLAN is absent, the first entity 131 stops the transmission of the WLAN measurement report.

(1) Operation Pattern 1

Figure 18:
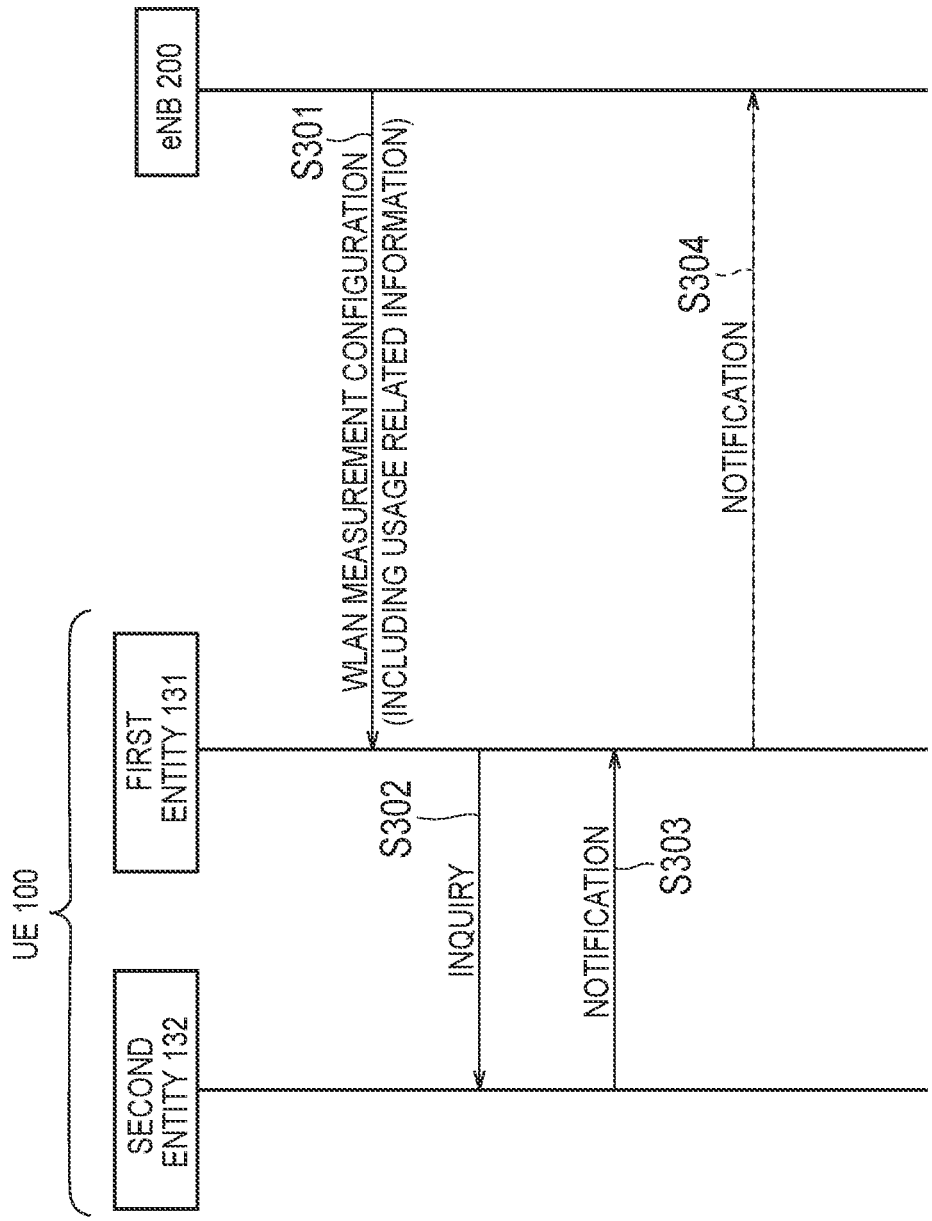
FIG. 18 is a sequence diagram illustrating an operation pattern 1 of a third embodiment.

FIG. 18 is a sequence diagram illustrating the operation pattern 1 of the third embodiment. Here, it is assumed that the usage related information indicates the "WLAN/3GPP interworking enhancement".

As illustrated in FIG. 18, in step S301, the eNB 200 transmits the WLAN measurement configuration to the UE 100. The eNB 200 may transmit the WLAN measurement configuration to the UE 100 by a "RRC connection reconfiguration" message which is a type of RRC signaling. The WLAN measurement configuration includes the usage related information. The first entity 131 of the UE 100 receives the WLAN measurement configuration including the usage related information.

In step S302, the first entity 131 inquires of the second entity 132 about the presence or absence of offloadable data.

In step S303, the second entity 132 notifies the first entity 131 of the result of the inquiry.

First, the operation of the first entity 131 notified of the presence of the offloadable data from the second entity 132 will be described. In this case, the first entity 131 notifies the eNB 200 of the presence of the offloadable data by, for example, the RRC signaling. The RRC signaling may be a completion response (RRC connection reconfiguration complete) message for the "RRC connection reconfiguration" message, or may be other messages. Alternatively, the first entity 131 does not explicitly notify the eNB 200 under the agreement that "not notifying=offloadable".

Second, the operation of the first entity 131 notified of the absence of the offloadable data from the second entity 132 will be described. In this case, the first entity 131 notifies the eNB 200 of the absence of the offloadable data by, for example, the RRC signaling. The RRC signaling may be a completion response (RRC connection reconfiguration complete) message for the "RRC connection reconfiguration" message, or may be other messages. Alternatively, the first entity 131 does not explicitly notify the eNB 200 under the agreement that "not notifying=non-offloadable".

If the offloadable data is absent, the eNB 200 may newly transmit the "RRC connection reconfiguration" message to the UE 100. The UE 100 and the eNB 200 may ignore the WLAN measurement configuration at least during the situation in which the offloadable data is absent.

(2) Operation Pattern 2

Figure 19:
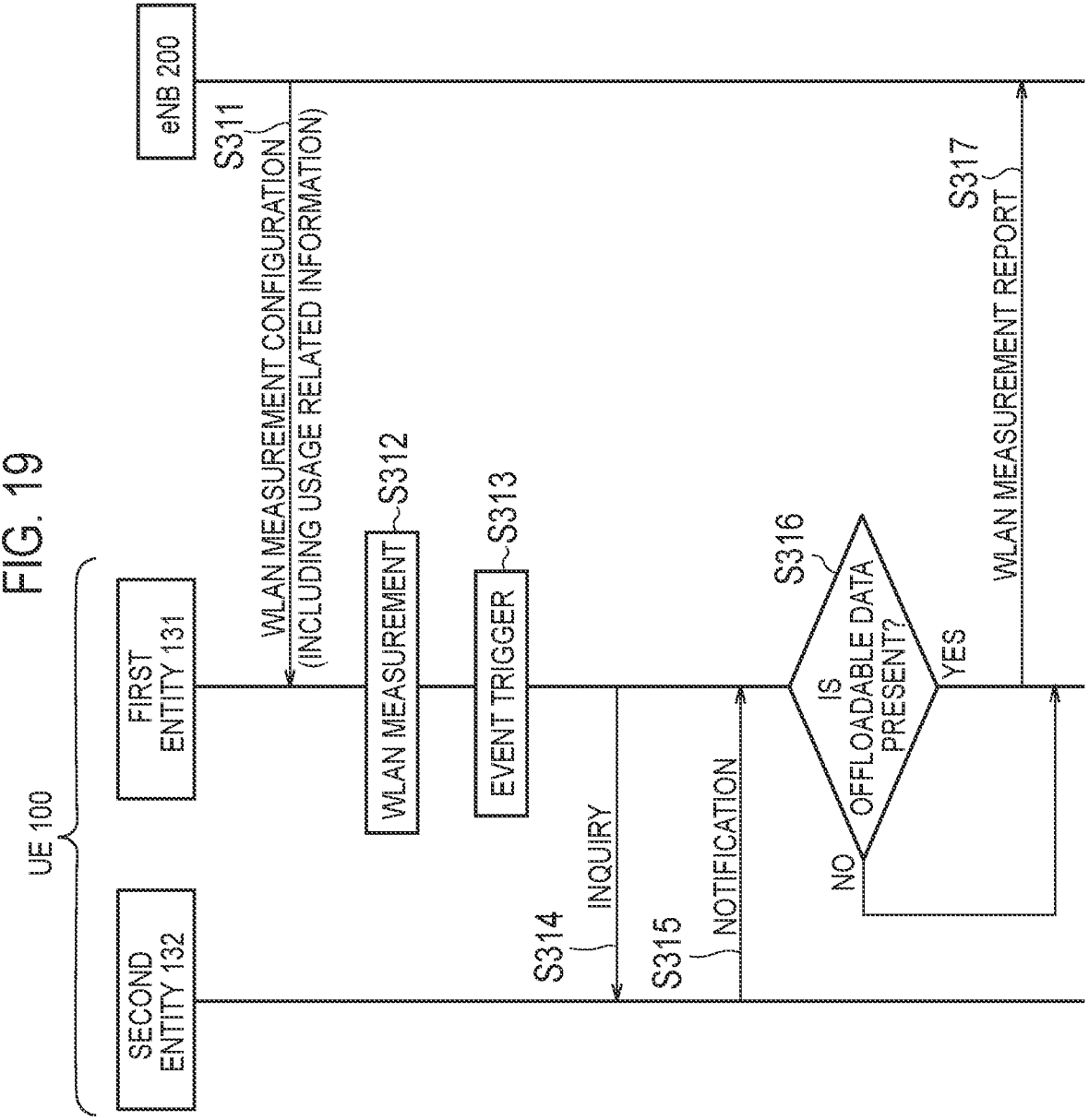
FIG. 19 is a sequence diagram illustrating an operation pattern 2 of the third embodiment.

FIG. 19 is a sequence diagram illustrating the operation pattern 2 of the third embodiment. The operation pattern 2 is an operation pattern that takes into account the possibility that the situation of the presence or absence of the offloadable data will change after the WLAN measurement configuration in the operation pattern 1. Here, it is assumed that the usage related information indicates the "WLAN/3GPP interworking enhancement".

As illustrated in FIG. 19, in step S311, the eNB 200 transmits the WLAN measurement configuration to the UE 100. The eNB 200 may transmit the WLAN measurement configuration to the UE 100 by the "RRC connection reconfiguration" message which is a type of RRC signaling. The WLAN measurement configuration includes the usage related information. The first entity 131 of the UE 100 receives the WLAN measurement configuration including the usage related information.

In step S312, the first entity 131 performs WLAN measurement based on the WLAN measurement configuration.

In step S313, the first entity 131 detects that the WLAN measurement result satisfies a reporting condition. The reporting condition is, for example, a condition that the WLAN signal strength becomes higher than the threshold.

In step S314, the first entity 131 inquires of the second entity 132 about the presence or absence of offloadable data.

In step S315, the second entity 132 notifies the first entity 131 of the result of the inquiry.

If the presence of the offloadable data is notified from the second entity 132 (step S316: YES), the first entity 131 transmits the WLAN measurement report to the eNB 200 in step S317.

On the other hand, if the absence of the offloadable data is notified from the second entity 132 (step S316: NO), the first entity 131 stops the transmission of the WLAN measurement report. Alternatively, the first entity 131 may notify the eNB 200 of the absence of the offloadable data only once.

Modification Example 1 of Third Embodiment

In the third embodiment described above, the presence or absence of the offloadable data is confirmed, but user preference information may be used as the determination criteria. Specifically, the first entity 131 inquires of the second entity 132 about the preference information of the user of its own UE 100, based on the usage related information included in the WLAN measurement configuration. The preference information includes at least one of on/off configuration of the WLAN communication function of its own UE 100 and the user's interest in the specific usage of the WLAN measurement report. For example, if the usage related information indicates the "WLAN/3GPP interworking enhancement", the first entity 131 inquires of the second entity 132 about whether the user is interested in the implementation of the "WLAN/3GPP interworking enhancement".

Modification Example 2 of Third Embodiment

In the third embodiment described above, an example in which the WLAN measurement configuration includes the usage related information has been described. However, the WLAN measurement configuration may not include the usage related information. The UE 100 may apply the operation according to the third embodiment not only to the case of the "WLAN/3GPP interworking enhancement" but also to the case of the "LTE-WLAN aggregation".

Modification Example 3 of Third Embodiment

In the modification example 1 of the third embodiment described above, the operation of determining whether to stop the transmission of the WLAN measurement report (the measurement report including the WLAN measurement result), based on the on/off configuration of the WLAN communication function of the UE 100 has been described. In the present modification example, details of this operation will be supplemented.

If the WLAN communication unit 120 is in an occupied state, the UE 100 performs control not to transmit the WLAN measurement report to the WWAN (eNB 200). Specifically, even if the WLAN measurement configuration has been set and the trigger condition of the WLAN measurement report is satisfied, the UE 100 may not transmit the WLAN measurement report when the WLAN communication unit 120 of the UE 100 is in the occupied state. Note that the WLAN communication unit 120 may be referred to as a "WLAN modem".

Here, the occupied state indicates a state in which the WLAN communication unit 120 cannot be used for RCLWI and/or LWA. In other words, the occupied state indicates a state in which the WLAN communication function that can be provided to the RCLWI and/or the LWA cannot be prepared. For example, a state in which the UE 100 has been connected to a specific WLAN by a user's manual operation corresponds to the occupied state. The specific WLAN is a WLAN (for example, a home WLAN) that is not an operator-controlled WLAN available for RCLWI and/or LWA.

If the WLAN communication unit 120 is in the occupied state, the UE 100 cannot follow the switching command. When such a UE 100 receives the switching command, an unexpected error may occur. Meanwhile, the eNB 200 transmits the switching command to the UE 100 based on the WLAN measurement report. Therefore, if the WLAN communication unit is in the occupied state, it is possible to prevent occurrence of an unexpected error by not transmitting the WLAN measurement report to the eNB 200 (that is, by stopping the transmission of the WLAN measurement report).

In addition, if the WLAN communication unit 120 is in the occupied state, the UE 100 may transmit, to the eNB 200, an indication indicating that the WLAN communication unit 120 is in the occupied state. The UE 100 may start the control of not transmitting the WLAN measurement report, which is triggered by the transmission of the indication. Based on the indication, the eNB 200 recognizes that the WLAN measurement report is not performed.

The control of not transmitting the WLAN measurement report may be control that does not apply the WLAN measurement configuration. In this case, the UE 100 may transmit, to the eNB 200, the indication indicating that the WLAN communication unit 120 is in the occupied state, or may maintain the WLAN measurement configuration without discarding the WLAN measurement configuration. After that, the UE 100 may resume the application of the WLAN measurement configuration when the WLAN communication unit 120 transitions to the unoccupied state (a state in which the WLAN communication unit 120 can be used for RCLWI and/or LWA).

Alternatively, the control of not transmitting the WLAN measurement report may be discarding the WLAN measurement configuration. In this case, the UE 100 discards the WLAN measurement configuration in response to transmitting, to the eNB 200, the indication indicating that the WLAN communication unit 120 is in the occupied state. In response to the reception of the indication, the eNB 200 may recognize that the WLAN measurement configuration has been discarded.

Modification Example 4 of Third Embodiment

In the present modification example, the WLAN measurement configuration includes information specifying the state of the WLAN communication unit 120 as a condition for transmitting the WLAN measurement report. The condition for transmitting the WLAN measurement report may be included in the reporting configuration (ReportConfig) in the WLAN measurement configuration. For example, that the WLAN communication unit 120 is in an unoccupied state is added as one of the conditions for transmitting the WLAN measurement report. The unoccupied state indicates a state in which the WLAN communication unit 120 can be used for RCLWI and/or LWA.

Here, an event that the WLAN state becomes better than the threshold is assumed as the condition (event trigger condition) for transmitting the WLAN measurement report. Such an event may be referred to as event W1. The WLAN state may be the WLAN measurement result, or an offset is given to the WLAN measurement result. In this case, a condition such as "the WLAN state is better than the threshold and the WLAN communication unit 120 is in the unoccupied state" is set as the condition for transmitting the WLAN measurement report. For example, the UE 100 determines whether to transmit the WLAN measurement report according to the following conditional expression.

[Math. 1]
Inequality W1-1 (Entering condition)
Ms-Hyz>Thresh, and its WLAN modem is available for LWA and/or RCLWI
Inequality W1-2 (Leaving condition)
Ms-Hys<Thresh, or its WLAN modem is occupied (i.e., not available for LWA and/or RCLWI)

Here, "Ms" indicates a WLAN measurement result, "Hys" indicates an offset value (hysteresis value), and "Thresh" indicates a threshold (which may be configured from the eNB 200). In addition, "Entering condition" indicates a condition for starting or resuming the process of transmitting the WLAN measurement report, and "Leaving condition" indicates a condition for stopping the process of transmitting the WLAN measurement report.

Fourth Embodiment

In a fourth embodiment, differences from the first to third embodiments will mainly be described below.

In the first embodiment described above, the operation in which the UE 100 notifies the WWAN (eNB 200) of the identifier indicating the WLAN to which the UE 100 has been connected has been described as an example. Further, in the third embodiment, the operation in which the UE 100 notifies the WWAN of the notification indicating that the UE 100 has data that is switchable from the WWAN to the WLAN has been described as an example. The fourth embodiment is an embodiment focusing on such notifications. Further, the fourth embodiment can be implemented in combination with the above-described embodiments.

In the following, the network selection operation of the terminal-based scheme is referred to as "RALWI (RAN Assisted LTE WLAN Interworking)", the network selection operation of the WLAN/3GPP interworking enhancement is referred to as "RCLWI (RAN Controlled LTE WLAN Interworking)", and the LTE-WLAN aggregation is referred to as "LWA". The RALWI is a Release 12 method, and RCLWI and LWA are a Release 13 method.

(Assumed Scenario)

Figure 20:
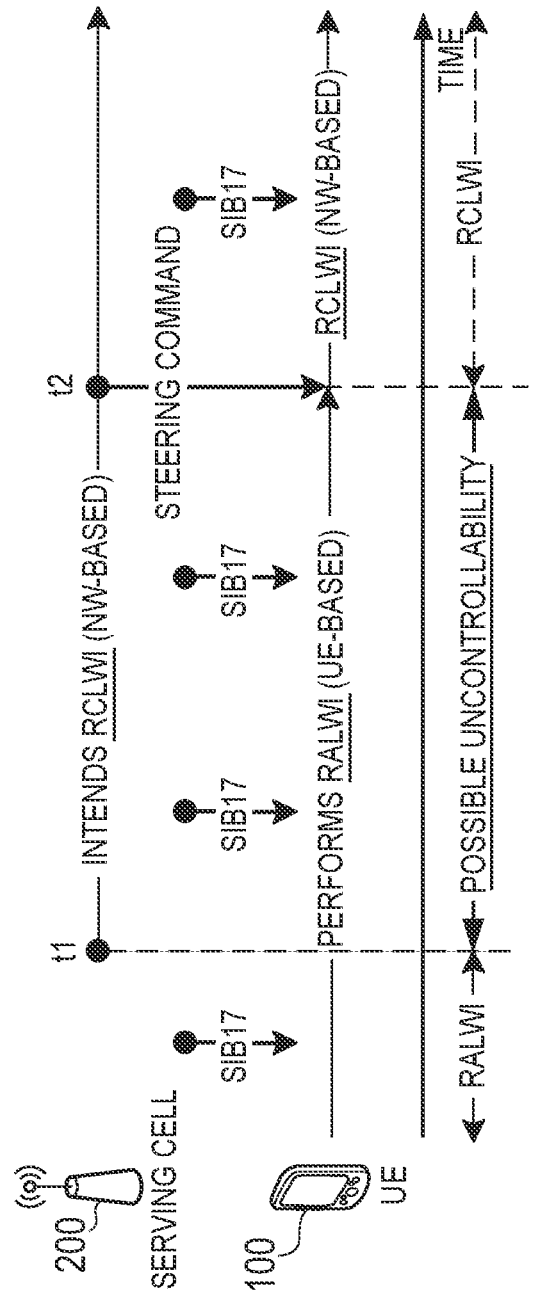
FIG. 20 is a diagram illustrating an assumed scenario according to a fourth embodiment.

FIG. 20 is a diagram illustrating an assumed scenario according to the fourth embodiment. In FIG. 20, RCLWI may be read as LWA.

As illustrated in FIG. 20, the eNB 200 transmits auxiliary information (RAN assistance parameters) for the RALWI by SIB 17. The eNB 200 determines to apply the RCLWI at time t1. The eNB 200 transmits the switching command (steering command) for RCLWI to the UE 100 at time t2. The UE 100 operates according to the RALWI until the switching command is received. When the switching command is received, the UE 100 operates according to the RCLWI.

Here, since the UE 100 operates according to the RALWI in the time interval between the time t1 and time t2, the UE 100 can perform switching (that is, offload) to the WLAN by the determination of the UE 100. Therefore, the UE 100 may perform an operation contrary to the intention of the eNB 200 to apply the RCLWI. If the UE 100 performs switching to the WLAN within the time interval between the time t1 to time t2, the UE 100 may not have data that is switchable from the WWAN to the WLAN at time t2. In addition, a similar phenomenon may occur when the user of the UE 100 performs a manual operation to connect to the WLAN. If such a UE 100 receives the switching command from the eNB 200, an unexpected error may occur. Specifically, an error may occur at an actual operation stage even if a configuration (reconfiguration) error of the switching command occurs or an error does not occur in the configuration.

(Operation According to Fourth Embodiment)

The UE 100 has a function of switching data between the WWAN and the WLAN based on information configured from the WWAN (eNB 200). Here, the function of switching the data between the WWAN and the WLAN is at least one function of RALWI, RCLWI, and LWA. "Data" is synonymous with "traffic". In addition, the information configured from the WWAN to the UE 100 includes at least one piece of information of auxiliary information for RALWI (RAN assistance parameters), a switching command for RCLWI or LWA (Steering Command), WLAN measurement configuration for RCLWI or LWA (MeasConfig). The switching command for LWA may be referred to as LWA configuration.

The UE 100 transmits, to the WWAN (eNB 200), a notification related to a state of connection to the WLAN. Hereinafter, this notification is referred to as a WLAN notification. The WLAN notification includes at least one of data related information indicating whether the UE 100 has data that is switchable from the WWAN to the WLAN and a WLAN related identifier indicating the WLAN to which the UE 100 has been connected. Details of the data related information and the WLAN related identifier will be described later.

In the example illustrated in FIG. 20, the UE 100 preferably transmits the WLAN notification to the eNB 200 at timing prior to time t2. The eNB 200 receives the WLAN notification from the UE 100 and configures the information for the above-described function (in particular, RCLWI or LWA) to the UE 100 based on the WLAN notification. In this manner, the UE 100 provides the eNB 200 with information related to the state of connection to the WLAN, and thus, the eNB 200 can properly control the RCLWI or the LWA.

Figure 21:
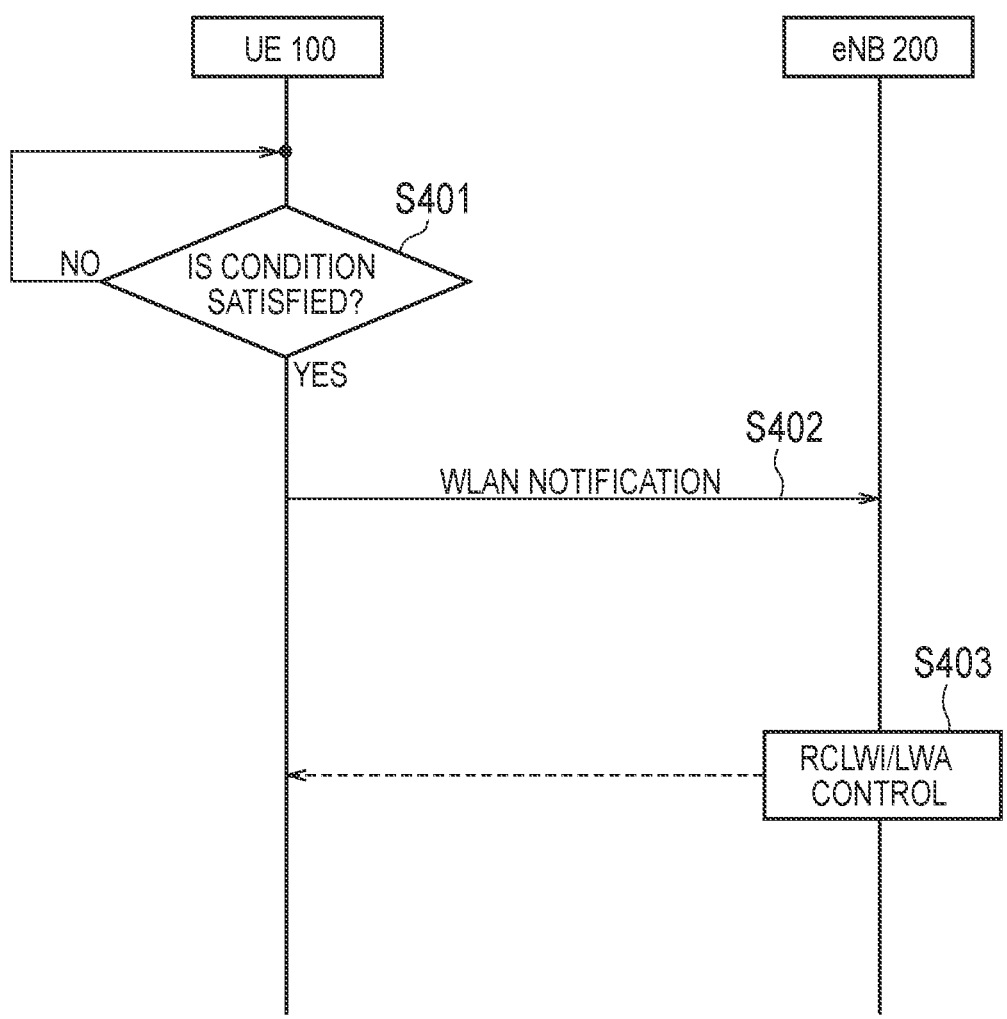
FIG. 21 is a diagram illustrating an operation sequence according to the fourth embodiment.

FIG. 21 is a diagram illustrating an operation sequence according to the fourth embodiment.

As illustrated in FIG. 21, in step S401, the UE 100 determines whether a condition for transmitting the WLAN notification (hereinafter, referred to as a "predetermined condition") is satisfied. The predetermined condition is at least one of first to fifth conditions.

The first condition is a condition that the UE 100 is in data communication. In other words, the first condition is a condition that traffic switchable to the WLAN is present. Alternatively, the first condition is a condition that the UE 100 has traffic via the WLAN (the UE 100 is communicating with the WLAN).

The second condition is a condition that the UE 100 transitions from an idle mode (RRC idle mode) to a connected mode (RRC connected mode). Note that the UE 100 may connect to the WLAN while being in the idle mode and then connect to the eNB 200 while maintaining the connection with the WLAN.

The third condition is a condition that the WLAN measurement is configured in the UE 100 from the WWAN (eNB 200) (that is, the UE 100 has the WLAN measurement configuration). When the WLAN measurement is configured, the UE 100 stops RALWI. Such a state is a state which is controlled by the RCLWI (or LWA) or the control of which is intended.

The fourth condition is a condition that a timer for prohibiting the transmission of the WLAN notification is not operating. The timer is managed by the UE 100. The timer is started when the UE 100 transmits the WLAN notification. The timer is used for prohibiting the transmission of the WLAN notification during a certain period after the transmission of the WLAN notification. When the timer expires, the transmission prohibition of the WLAN notification is canceled. A value of the timer may be configured in the UE 100 by the eNB 200, or may be a predetermined value.

The fifth condition is a condition that the WWAN (eNB 200) has permitted the transmission of the WLAN notification. The eNB 200 notifies the UE 100 of the permission or non-permission of transmission of the WLAN notification by broadcast signaling (for example, SIB 17) or dedicated signaling. The eNB 200 permits the transmission of the WLAN notification when the control by RCLWI or LWA is intended. On the other hand, the eNB 200 does not permit the transmission of the WLAN notification when the control by the RALWI is intended.

If the predetermined condition is satisfied (step S401: YES), the UE 100 transmits the WLAN notification to the eNB 200 in step S402. As described above, the WLAN notification includes at least one of data related information indicating whether the UE 100 has data that is switchable from the WWAN to the WLAN and a WLAN related identifier indicating the WLAN to which the UE 100 has been connected (hereinafter, referred to as "connected WLAN").

The data related information is information indicating that the UE 100 has data that is switchable from the WWAN to the WLAN. The data related information may include the identifier or the number of predetermined units that are switchable (offloadable) from the WWAN to the WLAN. The predetermined unit is a unit for switching data from the WWAN to the WLAN. For example, the predetermined unit is an APN, a session, a bearer, an IP flow, or the like. Note that the bearer may be an EPS bearer or may be a DRB. The number of predetermined units is the number of APNs, the number of sessions, the number of bearers, the number of IP flows, or the like. Further, the identifier of the predetermined unit is an APN ID, a session ID, a bearer ID, an IP flow ID, or the like. The UE 100 may not include traffic that has already been offloaded (predetermined unit) in the data related information. Alternatively, the UE 100 may associate an identifier indicating whether the traffic is offloadable with respect to each traffic including offloaded traffic. The identifier may be, for example, "offloadable", "non-offloadable", "already offloaded", or the like.

The WLAN related identifier includes at least one of an identifier of a connected WLAN, an index of a connected WLAN, and an identifier of a group (mobility set) including a connected WLAN. The WLAN related identifier may be included in the WLAN notification only when the UE 100 is connected to the WLAN. Here, "connected" may be a state in which data communication via the WLAN is established. Alternatively, "connected" may be a state in which a WLAN connection process (security authentication or the like) has been completed although data communication is not established. In addition, the WLAN related identifier may be an identifier related to a WLAN that is connected to the UE 100 and satisfies a specific condition (hereinafter, referred to as a "specific WLAN"). In this case, if the connected WLAN is not the specific WLAN, the UE 100 does not include the WLAN related identifier related to the connected WLAN in the WLAN notification. The specific WLAN may be a WLAN connected by the determination of the UE 100 based on the auxiliary parameter provided from the WWAN (that is, a WLAN connected by RALWI). Alternatively, the specific WLAN may be a WLAN connected by a user's manual operation. Alternatively, the specific WLAN may be a WLAN to which the UE 100 is connected during an idle mode.

The UE 100 may include the WLAN notification in the WLAN measurement report and then transmit the WLAN measurement report to the eNB 200. Alternatively, the UE 100 may include the WLAN notification in another message, such as UE assistance information or WLAN status indication, and then transmit the message to the eNB 200. Here, an example in which the WLAN notification is included in the WLAN measurement report is assumed. The UE 100 may include at least one of the identifier of the connected WLAN, the identifier of the mobility set including the connected WLAN, and the measurement object including the connected WLAN in the WLAN notification (WLAN measurement report) as the WLAN related identifier. Alternatively, the UE 100 may associate information indicating the connection state with at least one of the identifier of the measured WLAN, the identifier of the mobility set including the measured WLAN, and the measurement object including the measured WLAN. The information indicating the connection state may include at least one of "connected (trafficSteered)", "not connected", "not connectable", and "not disconnectable". The information indicating the connection state may be defined as information (cause value) indicating the cause.

In step S403, the eNB 200 performs RCLWI control or LWA control on the UE 100 based on the WLAN notification received from the UE 100. The eNB 200 may determine that the UE 100 has offloadable traffic based on the data related information, and determine to apply the RCLWI or LWA to the UE 100. The eNB 200 may determine traffic to be offloaded (predetermined unit) based on the data related information. For example, the eNB 200 may modify the contents of the WLAN measurement configuration (including the mobility set) to be configured in the UE 100 based on the WLAN related identifier.

For example, the eNB 200 performs at least one of the first process to the third process based on the WLAN notification.

As the first process, the eNB 200 determines or modifies the mobility set to be configured in the UE 100. For example, the eNB 200 may add the identifier of the connected WLAN to the mobility set that is configured in the UE 100. The eNB 200 may exclude, from the mobility set configured in the UE 100, a WLAN in which transparent mobility with the connected WLAN is not permitted (that is, a WLAN requiring control from the eNB 200 upon modification of the WLAN connection destination).

As the second process, the eNB 200 determines whether to transmit the switching command to the UE 100 (or whether the switching command can be transmitted). If the switching command for LWA is transmitted to the UE 100, the eNB 200 may determine to use the WT accommodating the notified WLAN (that is, the connected WLAN) for the LWA.

As the third process, the eNB 200 stops the modification or the application of the WLAN measurement configuration. For example, the eNB 200 may de-configure at least one of the WLAN measurement configuration, the RCLWI configuration, and the LWA configuration. The eNB 200 may suspend or resume at least one of the WLAN measurement configuration, the RCLWI configuration, and the LWA configuration.

OTHER EMBODIMENTS

In the above embodiments, the LTE system has been exemplified as the WWAN system. However, the present disclosure is not limited to the LTE system. The present disclosure may be applied to a WWAN system other than the LTE system.

[Additional Note 1]

1.1.1 Coexistence with Rel-12 UE-based WLAN interworking.

Solution 3 which is studied in Rel-12 is network-based solution. On the other hand, Rel-12 interworking is UE-based solution. We have to study priority order which entity/function/rule/policy should decide traffic steering.

As a baseline, ANDSF policy has higher priority than RAN rule. AS layer in UE just forward the result of RAN rule to upper layer. And the upper layer decides how to steer traffic to/from WLAN.

From compatibility stand point, this manner should be kept. Rel-13 interworking should just update how the UE AS layer forwards the result to upper layer.

RAN2 should just update how UE AS layer forward RAN related information to upper layer.

In Rel-12 interworking, dedicated parameters are handled by UE in higher priority than broadcasted parameters. For the same reason, this priority order should be reused in Rel-13 interworking enhancement. Steering command in Rel-13 interworking should be handled as higher priority than result of RAN rule since solution 3 is applicable to UE in RRC connected mode and steering command may be provided via RRC message. Steering command does never conflict with result of RAN rule with dedicated RAN assistance parameters because both steering command and dedicated RAN assistance parameters are provided by the same eNB via dedicated RRC message.

Steering command in Rel-13 interworking enhancement should be handled as higher priority than result of RAN rule.

Existing Scheme

Statement in RRC Specification 5.6.12.2 Dedicated WLAN offload configuration

The UE shall:

1> if the received wlan-OffloadDedicated is set to release:
2> release wlan-OffloadDedicated and inform upper layers about the release;
2> if the wlan-OffloadConfigCommon corresponding to the RPLMN is broadcast by the cell:
3> apply the wlan-OffloadConfigCommon corresponding to the RPLMN included in SystemInformationBlockType17;
3> forward the wlan-OffloadConfigCommon corresponding to the RPLMN to upper layer;
1> else:
2> if the received wlan-OffloadDedicated includes thresholdRSRP:
3> apply the received thresholdRSRP;
3> forward the received thresholdRSRP to upper layers;
. . .

Statement in Idle Mode Specification

The upper layers in the UE shall be notified (see TS 24.302 [28]) when and for which WLAN(s), that matches all the provided identifiers (in subclause 5.6.3) for a specific entry in the list, the following conditions 1 and 2 for steering traffic from E-UTRAN to WLAN are satisfied for a time interval TsteeringwLAN:

1. In the E-UTRAN serving cell:
$RSRPmeas < Thresh_{ServingOffloadWLAN, LowP}$; or
$RSRQmeas < Thresh_{ServingOffloadWLAN, LowQ}$;
2. In the target WLAN:
$ChannelUtilizationWLAN < Thresh_{ChUtilWLAN, Low}$; and
$BackhaulRateD1WLAN > Thresh_{BackhRateDLWLAN, High}$; and
$BackhaulRateU1WLAN > Thresh_{BackhRateULWLAN, High}$; and
$BeaconRSSI > Thresh_{BeaconRSSIWLAN, High}$;
. . .

As current specification of RRC shown in the above, AS layer forwards information to upper layer. This scheme should be kept. From this perspective, UE should keep dedicated parameters when it receives steering command from eNB, and forward the parameters to upper layer as the same scheme of Rel-12.

UE should keep dedicated parameters when it receives steering command from eNB.

Considering steering command is provided by eNB via RRC message, RRC mechanism should be updated to notify the steering command to upper layer.

For example:

```
wlan-SteeringCommand ::=    SEQUENCE {
    WLAN-Id-r13             WLAN-Id-List-r12,
    steeringState           ENUMERATED {toLTE,toWLAN,null}
}
```

Idle mode procedure should be modified to avoid current behavior during the steeringState is wither toLTE or toW-LAN.

[Additional Note 2]

1. Introduction

In Rel-13, the enhancements to LTE-WLAN Interworking aim to improve overall user throughput by means of the network-controlled WLAN offloading. One of the guidelines of this WID is to develop solutions that will co-exist with other 3GPP/WLAN interworking solutions. Furthermore, SA2 has also informed RAN2 of the agreed solution for "Co-existence between LTE-WLAN Radio Level Integration and Interworking Enhancement and other WLAN offloading solutions (e.g. ANDSF)", which resolves the issue with co-existence issue in the higher layer.

In this additional note, the issues with co-existence with existing solutions are discussed from the perspective of the UE's AS-layer.

2. Discussion

It is assumed that UE's supporting WLAN interworking may be required to support both the Rel-12 RAN-assisted LTE-WLAN Interworking (RALWI) and the Rel-13 RAN-controlled LTE-WLAN Interworking (RCLWI). Based on our understanding the new mechanism (RCLWI) is based on the outcome of the Rel-12 study, i.e., Solution 3 which describes "For UEs in IDLE mode and CELL_FACH, CELL_PCH and URA_PCH states the solution is similar to solution 1 or 2". Therefore, the Rel-13 solution may reuse or extend the mechanism already specified for RALWI in Rel-12. In particular, the UE's handling of SIB17 in Rel-13 in the AS-layer should be further discussed, as the existing SIB17 from Rel-12 is necessary to support ANDSF and for traffic steering in IDLE UEs.

Proposal 1: RAN2 should discuss the UE's AS-layer behaviour in Rel-13 in the presence of SIB17 required to support ANDSF and IDLE UEs in Rel-12.

2.1. Connected Mode UE Behavior

In Rel-12, RALWI adopted the UE-based mechanism assisted by the NW. On the other hand, Rel-13 RCLWI would support the full NW-controlled traffic steering. So, if SIB17 is broadcasted as suggested in Proposal 1, the UE may arbitrarily perform the traffic steering according to the RAN rule (RALWI) even when the serving cell intends to control the UE with RCLWI, i.e., the steering command. For example, if the UE's AS-layer behavior is not well-defined, there may be situations wherein the serving cell wanted the UE to keep its traffic on LTE but the UE may have already decided to move traffic to WLAN. It's no longer full-controllable from the serving cell's perspective. So, it's preferable that the use of RALWI and RCLWI can be controlled independently even if they share the same mechanism (i.e., the existence of SIB17).

Observation 1: If the UE's AS-layer behaviour for Rel-13 is not properly specified there may be a mismatch between the serving cell's intention and the UE's behaviour for traffic steering.

The issue described in Observation 1 is one of the topics and it was discussed whether the steering command should be defined with infinite thresholds of the existing RAN assistance parameter or as a new message, i.e., "Proposal 1" or "Proposal 2". Although both approaches would work to support the required steering command, it may be worth further consideration on their applicability to unambiguously select RALWI and RCLWI without excessive UE complexity. With the use of the infinite thresholds, i.e., "Proposal 1", the serving cell may activate RCLWI as soon as the thresholds are configured with the infinite values and this will serve to stop any existing RALWI. However, even if the infinite thresholds approach is adopted, RALWI may still be performed up to the time when the UE receives the steering command (when the UE receives the configuration with infinite thresholds), as illustrated in FIG. 20.

Observation 2: The UE-based traffic steering (RALWI) may continue until it receives the infinite thresholds, e.g., until SIB17 is updated with infinite thresholds.

Proposal 2: RAN2 should discuss whether it is necessary to solve the potential uncontrollability condition that arises due to the presence of SIB17 as part of the NW-based mechanism.

If Proposal 2 is agreeable, four alternatives may be considered as follows;

Alternative 1: Pre-steering command stops RALWI

It may be possible, especially with the infinite thresholds approach, that the serving cell sends the steering command when it intends to use RCLWI, regardless of where the traffic was actually steered.

Alternative 2: SIB indicates to stop RALWI

SIB may be used to indicate whether RALWI is allowable. Rel-13 UEs should always prioritize RCLWI over RALWI whenever RALWI is prohibited, even if SIB17 or the dedicated RAN assistance parameter is provided.

Alternative 3: WLAN measurement object stops RALWI

If the serving cell configures the UE with at least one WLAN measurement object, the UE will assume the serving cell intends to use RCLWI. Thus, the UE should stop performing RALWI whenever a WLAN measurement object is configured.

Alternative 4: UE in CONNECTED stops RALWI

The UE does not follow RALWI with the broadcasted RAN assistance parameter once it transitions to CONNECTED. In other words, a Rel-13 UE in CONNECTED will always ignore SIB17.

Although all alternatives can be supported with simple enhancements, Alternative 1 or Alternative 3 would be beneficial from the per-UE controllability point of view, while Alternative 2 or Alternative 4 would be beneficial by avoiding NW complexity. Between Alternative 1 and Alternative 3, Alternative 1 by itself may require additional enhancement to work correctly while the measurement configuration required with RCLWI in Alternative 3 implicitly stops the RALWI process. And between Alternative 2 and Alternative 4, Alternative 2 requires an explicit indication while Alternative 4, which assumes RALWI and RCLWI do not co-exist for UEs in CONNECTED, does not require any indication. From the perspective of signaling overhead and NW complexity, one of the implicit mechanisms is preferable. Considering LTE-WLAN Aggregation (LWA) is also performed under UEs in CONNECTED and the UE is configured with WLAN measurements to add/modify/release the resources provided by WLAN, only Alternative 3 or Alternative 4 should be considered for the NW-based mechanism.

Proposal 3: RAN2 should decide whether the UE-based traffic steering (RALWI) should be allowed when the UE is configured with WLAN measurement objects or in CONNECTED, and whether Alternative 3 or Alternative 4 should be adopted for the NW-based solution (RCLWI).

Assuming the above requirements are clarified, it is also necessary to discuss whether the serving cell should know the initial condition of steered traffic should be when the serving cell intends to perform either RCLWI or LWA. For example, when the serving cell configures the UE with LWA Configuration but some types of the UE's traffic are already steered to WLAN, the improvement of user throughput may be limited or some errors in the configuration may occur. One of the simplest/safetiest ways could be the UE moves all traffic to LTE when it's configured with WLAN measurement objects, but it may cause some negative impacts, such as overloading in LTE or ping-pong by the steering command Another possibility would be for the UE to inform the serving cell of its traffic status, which may include various possibilities such as cause values within the WLAN modem status report, availability of offloadable traffic and so on. In addition, when the UE does not have the freedom of WLAN modem for RCLWI or LWA, e.g., in case that it already connected to a user-preferred WLAN, it's preferable the UE should not be required to send any WLAN measurement report. In that sense, the serving cell would know the traffic status of the UE in advance of the measurement configuration.

Proposal 4: RAN2 should discuss whether the serving cell should be aware if any of UE's traffic is already active on an operator WLAN.

Proposal 5: RAN2 should discuss whether the initial condition of traffic should be given upon/before WLAN measurement objects are configured.

If Proposal 4 is desirable, RAN 2 should also consider whether the information regarding existing traffic on WLAN should be provided to the serving cell before or after the WLAN measurement configuration.

Proposal 6: RAN2 should also decide if the information on the existing traffic on WLAN needs to be provided to the serving cell before or after the WLAN measurement configuration.

2.2. IDLE mode UE behavior

Figure 22:
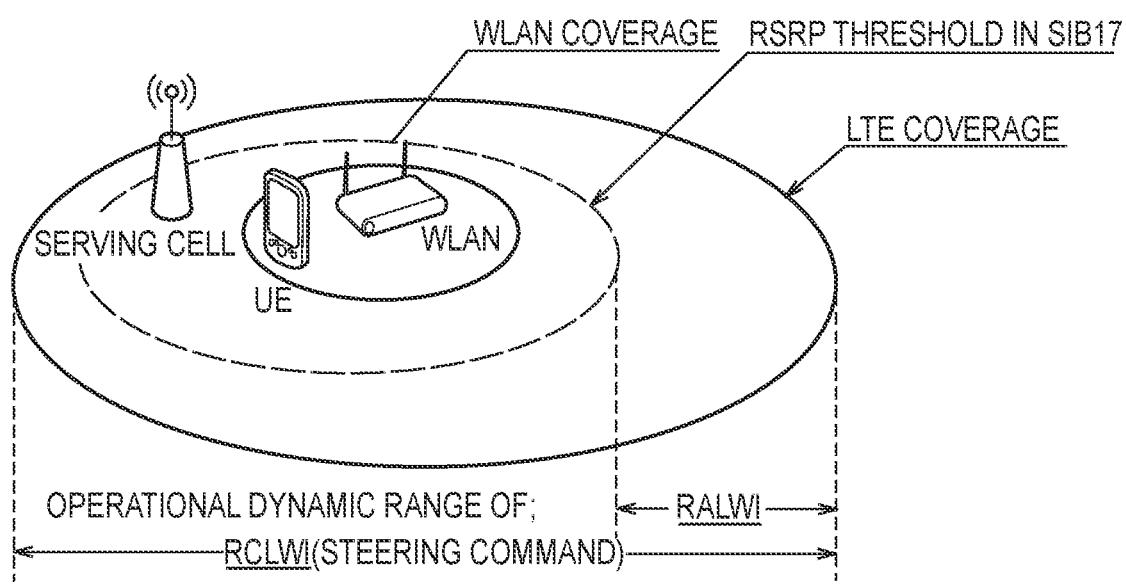
FIG. 22 is a diagram according to a supplementary note of the embodiment.

The UE behavior in IDLE was discussed, and it provides a good summary and evaluations of the four solutions already proposed, i.e., "Proposal A~D" and "E". One of the main discussions was whether or not to support T350 after Rel-13 UE transitions to IDLE, i.e., "Proposal A/B" or "C/D". If any timer is not supported, it may also cause frequent ping-ponging which results in negative impacts on UE battery consumption, e.g., due to the frequent transfer of PDN connection as pointed out. For example, for the UE located near the eNB, the UE's traffic will likely remain in LTE under Rel-12 RALWI due to the stronger RSRP assuming the serving cell is not interested in steering traffic of all UEs to WLAN. However, for Rel-13, the traffic for such an UE may be steered to WLAN with the steering command since the steering command may be easily directly towards specific UEs without affecting other un-targeted UEs, as illustrated in FIG. 22. When the UE transitions to IDLE and remains connected to WLAN, the UE may move its traffic back to LTE immediately, assuming the UE follows the RAN rule (RALWI) in IDLE, if Proposal 1 is agreeable. So, the timer should be used to avoid such ping-ponging. In addition, it should be discussed whether to reuse T350 starts upon RRC Connection Release, or to introduce a new timer starts upon reception of the steering command.

Proposal 7: A validity timer for the steering command after the UE transitions to idle mode should be introduced, e.g., T350.

If Proposal 7 is agreeable, another issue is how the UE behaves after the timer expires. Four options are potential candidates;

Option 1: After the timer expiry, the UE follows RALWI with SIB17. ("Proposal A" and partially "Proposal E")

Option 2: Upon the timer expiry, the UE moves its traffic back to LTE, if active traffic are present. ("Proposal B")

Option 3: The UE keeps its traffic in WLAN, unless the WLAN connection failure is declared. ("Proposal C" and partially "Proposal E")

Option 4: The UE keeps its traffic in WLAN, unless the WLAN measurement event is triggered. ("Proposal D")

Option 1 may be the baseline since it only reuses the existing mechanism, i.e., no standardization effort is foreseen.

Option 2 offers a simpler way to give a default condition from the NW point of view, i.e., it's predictable since the traffic in IDLE mode always stay in LTE. However, it's unclear how the UE decides whether to follow SIB17 (as Rel-12 RALWI) or to move traffic back to LTE regardless of SIB17 (as a new behavior in Rel-13).

Option 3 could be interpreted that the steering command, which received in advance of transition to IDLE, is expected to be valid forever as long as the UE can maintain the connection to WLAN, wherein the criteria may be reused one for the WLAN status reporting as agreed that "The exact criteria to determine "WLAN connection failure" towards a WLAN are not specified" So, this option is actually left up to UE implementation. Also, as the same to Option 2, it's unclear which behavior the IDLE UE should follow, Rel-12 RALWI or Rel-13 mechanism.

Option 4 may potentially provide the same behavior in CONNECTED. However, it's not crystal clear whether the UE would know what to do from the event trigger information, since currently the events just triggers the WLAN measurement reporting, i.e., it's up to NW implementations which link the UE moves its traffic to. Also, similar to Options 2 and 3, it's unclear which behavior the IDLE UE should follow, Rel-12 RALWI or Rel-13 mechanism.

Although Option 1 is our preference, considering the Rel-13 Interworking Enhancement is expected to provide better NW controllability, it may be necessary to at least allow the serving cell to determine if the UE should follow the RALWI with SIB17 e.g., with an indication from the serving cell. Alternatively, the new mechanisms for IDLE UEs described in Options 2~4 provide a more deterministic UE behavior from the network's perspective and maybe considered more suitable for Rel-13.

Proposal 8: RAN2 should decide if it is necessary to adopt any new behaviour for IDLE UEs or if it is sufficient for IDLE UEs to follow the existing RAN rule, i.e, the same behaviour as in Rel-12.

The invention claimed is:

1. A radio terminal comprising:
   a controller having a function of switching data between a wireless wide area network (WWAN) and a wireless local area network (WLAN) based on information configured from the WWAN; and
   a transmitter configured to transmit, to the WWAN, a WLAN measurement report in response to satisfaction of a predetermined condition, the WLAN measurement report including:
   a WLAN identifier indicating a first WLAN to which the radio terminal has been connected; and a WLAN measurement result of the first WLAN, wherein the predetermined condition includes a condition that WLAN measurement configuration information including a plurality of WLAN identifiers is received by the radio terminal from the WWAN and the WLAN identifier indicating the first WLAN is included in the plurality of WLAN identifiers, and the WLAN measurement result includes a RSSI of the first WLAN and a channel utilization of the first WLAN and a backhaul rate of the first WLAN, wherein the channel utilization of the first WLAN is a radio load level of the first WLAN and the backhaul rate of the first WLAN is a backhaul load level of the first WLAN.

2. The radio terminal according to claim 1, further comprising a WLAN communication unit configured to perform communication with the WLAN, wherein when the WLAN communication unit is in a state in which the function is unusable, the controller is configured to perform control not to transmit the WLAN measurement report to the WWAN.

3. A device for controlling a radio terminal, comprising a processor configured to cause the radio terminal to:

switch data between a wireless wide area network (WWAN) and a wireless local area network (WLAN) based on information configured from the WWAN; and transmit, to the WWAN, a WLAN measurement report in response to satisfaction of a predetermined condition, the WLAN measurement report including: a WLAN identifier indicating a first WLAN to which the radio terminal has been connected; and a WLAN measurement result of the first WLAN, wherein the predetermined condition includes a condition that WLAN measurement configuration information including a plurality of WLAN identifiers is received by the radio terminal from the WWAN and the WLAN identifier indicating the first WLAN is included in the plurality of WLAN identifiers, and the WLAN measurement result includes a RSSI of the first WLAN and a channel utilization of the first WLAN and a backhaul rate of the first WLAN, wherein the channel utilization of the first WLAN is a radio load level of the first WLAN and the backhaul rate of the first WLAN is a backhaul load level of the first WLAN.

4. A method performed at a radio terminal, comprising:

switching data between a wireless wide area network (WWAN) and a wireless local area network (WLAN) based on information configured from the WWAN; and transmitting, to the WWAN, a WLAN measurement report in response to satisfaction of a predetermined condition, the WLAN measurement report including: a WLAN identifier indicating a first WLAN to which the radio terminal has been connected; and a WLAN measurement result of the first WLAN, wherein the predetermined condition includes a condition that WLAN measurement configuration information including a plurality of WLAN identifiers is received by the radio terminal from the WWAN and the WLAN identifier indicating the first WLAN is included in the plurality of WLAN identifiers, and the WLAN measurement result includes a RSSI of the first WLAN and a channel utilization of the first WLAN and a backhaul rate of the first WLAN, wherein the channel utilization of the first WLAN is a radio load level of the first WLAN and the backhaul rate of the first WLAN is a backhaul load level of the first WLAN.

* * * * *